United States Patent
Aoki et al.

(10) Patent No.: US 7,852,379 B2
(45) Date of Patent: Dec. 14, 2010

(54) IMAGE FORMING APPARATUS, IMAGE FORMING METHOD, AND COMPUTER PROGRAM PRODUCT

(75) Inventors: Takahiro Aoki, Kawasaki (JP); Soichi Hama, Kawasaki (JP); Mitsuaki Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 989 days.

(21) Appl. No.: 11/699,412

(22) Filed: Jan. 30, 2007

(65) Prior Publication Data

US 2008/0079842 A1 Apr. 3, 2008

(30) Foreign Application Priority Data

Sep. 29, 2006 (JP) .............................. 2006-268009

(51) Int. Cl.
*H04N 5/228* (2006.01)
*H04N 9/68* (2006.01)
*H04N 5/222* (2006.01)
*H04N 5/238* (2006.01)
*H04N 9/79* (2006.01)

(52) U.S. Cl. .................... 348/222.1; 348/234; 348/370; 348/366; 348/223.1

(58) Field of Classification Search ................. 348/362, 348/364, 366, 370, 371, 223.1, 239, 296–297, 348/222.1, 234, 237; 396/98, 155
See application file for complete search history.

(56) References Cited

U.S. PATENT DOCUMENTS

| | | | |
|---|---|---|---|
| 6,144,366 A | 11/2000 | Numazaki et al. | |
| 6,546,203 B2 * | 4/2003 | Hofer | 348/371 |
| 6,859,565 B2 * | 2/2005 | Baron | 348/E5.038 |
| 7,652,717 B2 * | 1/2010 | Enge et al. | 348/371 |
| 2004/0080623 A1 * | 4/2004 | Cleveland et al. | 348/208.1 |
| 2004/0135825 A1 | 7/2004 | Brosnan | |
| 2005/0094895 A1 * | 5/2005 | Baron | 348/224.1 |
| 2006/0008171 A1 * | 1/2006 | Petschnigg et al. | 382/254 |

FOREIGN PATENT DOCUMENTS

| | | | |
|---|---|---|---|
| JP | 10-177449 A | | 6/1998 |
| JP | 2002-010030 A | | 1/2002 |
| JP | 2003-187230 A | | 7/2003 |
| JP | 2004-220612 A | | 8/2004 |

* cited by examiner

*Primary Examiner*—Nhan T Tran
(74) *Attorney, Agent, or Firm*—Westerman, Hattori, Daniels & Adrian, LLP

(57) ABSTRACT

An image forming apparatus causes an illuminating unit and an imaging unit to equally split a predetermined exposure time into a plurality of split exposure times, and acquire an image with illumination and an image without illumination in each of the split exposure time. A luminance difference image for a particular split exposure time is calculated by subtracting the image without illumination from the image with illumination of the exposure time. The luminance difference images of all the split exposure times are integrated.

17 Claims, 21 Drawing Sheets

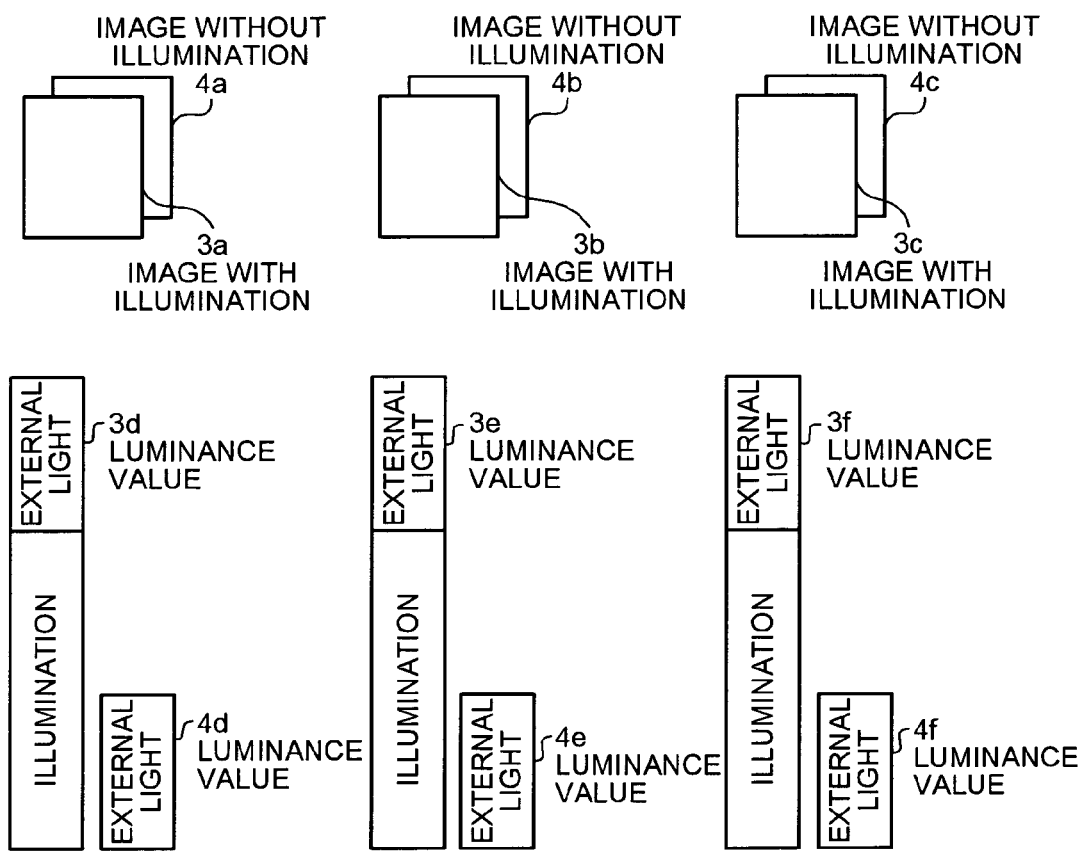

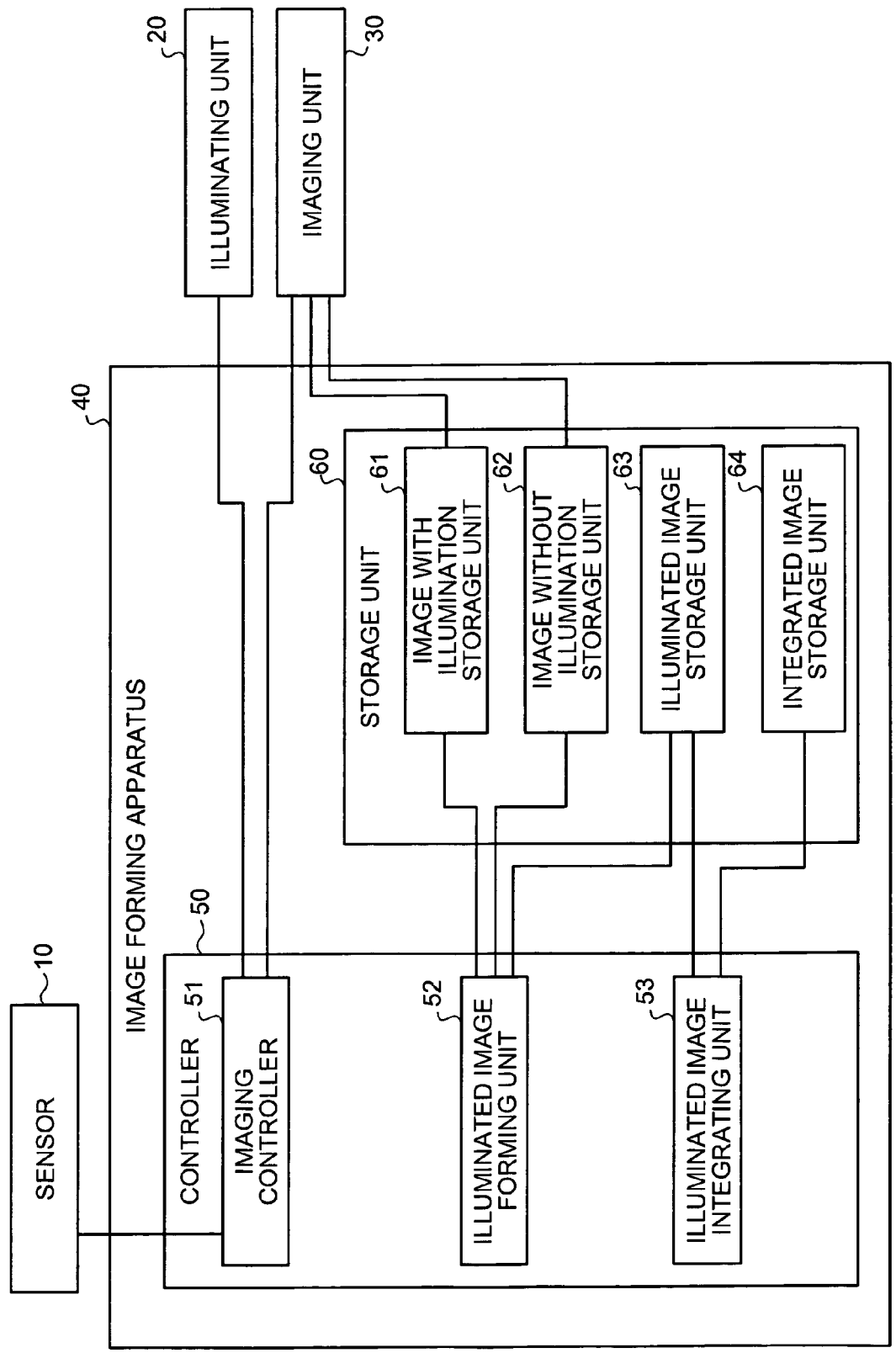

AVERAGE LUMINANCE VALUE J(1)

AVERAGE LUMINANCE VALUE $I(N_0) \times$ SPLIT NUMBER $N_0$ —92 EXTERNAL LIGHT INTENSITY

FIG.11

| EXTERNAL LIGHT INTENSITY (Lx) | SPLIT NUMBER |
|---|---|
| 0 TO 300 | 0 |
| 300 TO 1000 | 1 |
| 1000 TO 2000 | 2 |
| 2000 TO 4000 | 4 |
| ⋮ | ⋮ |

FIG.16
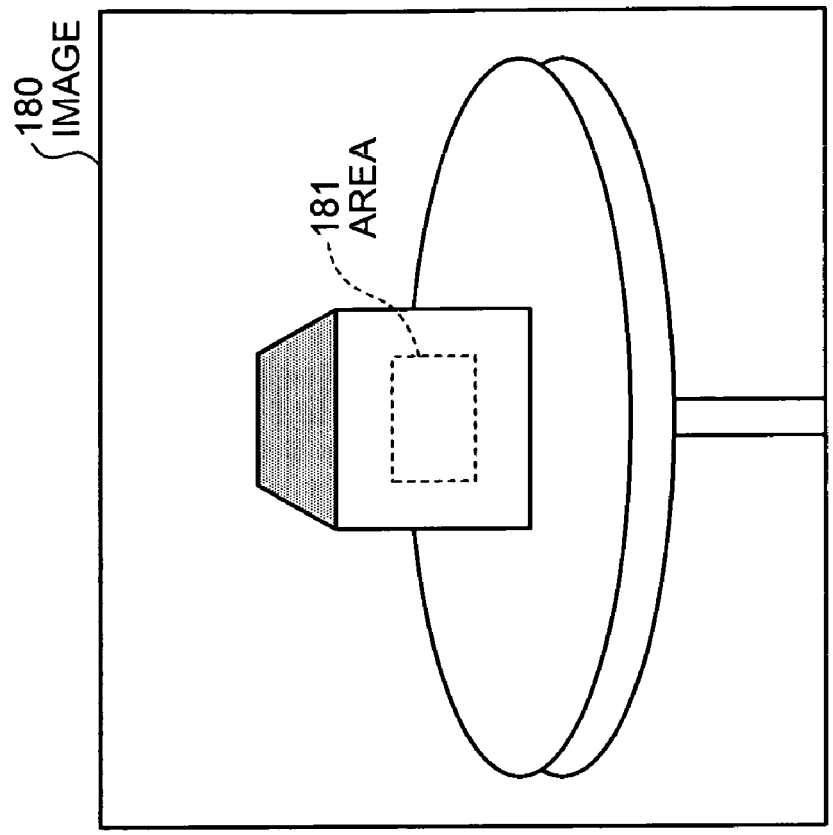
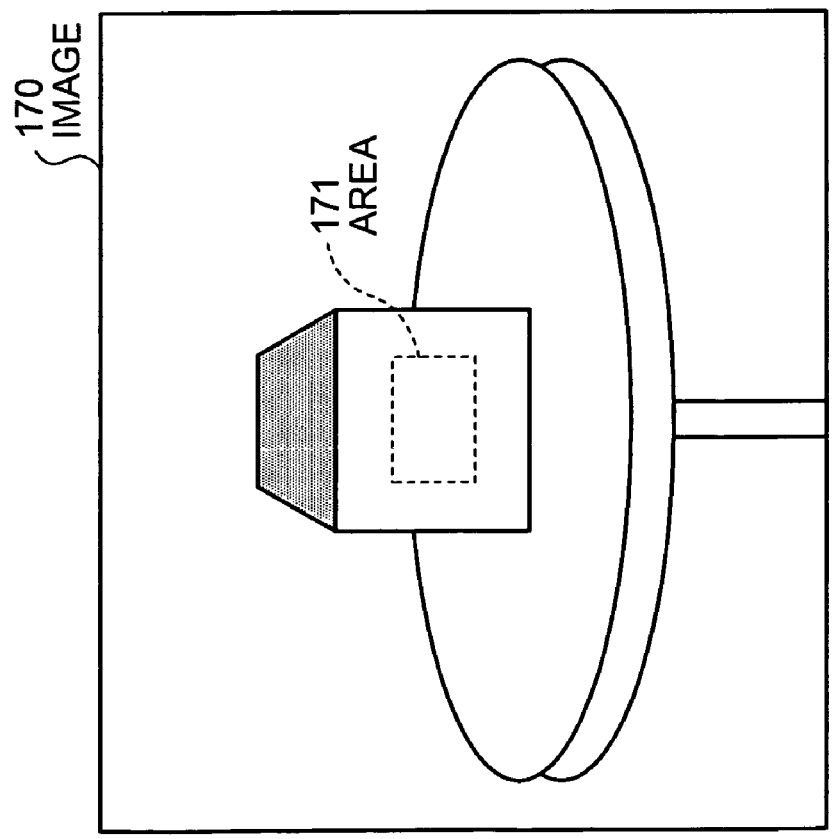

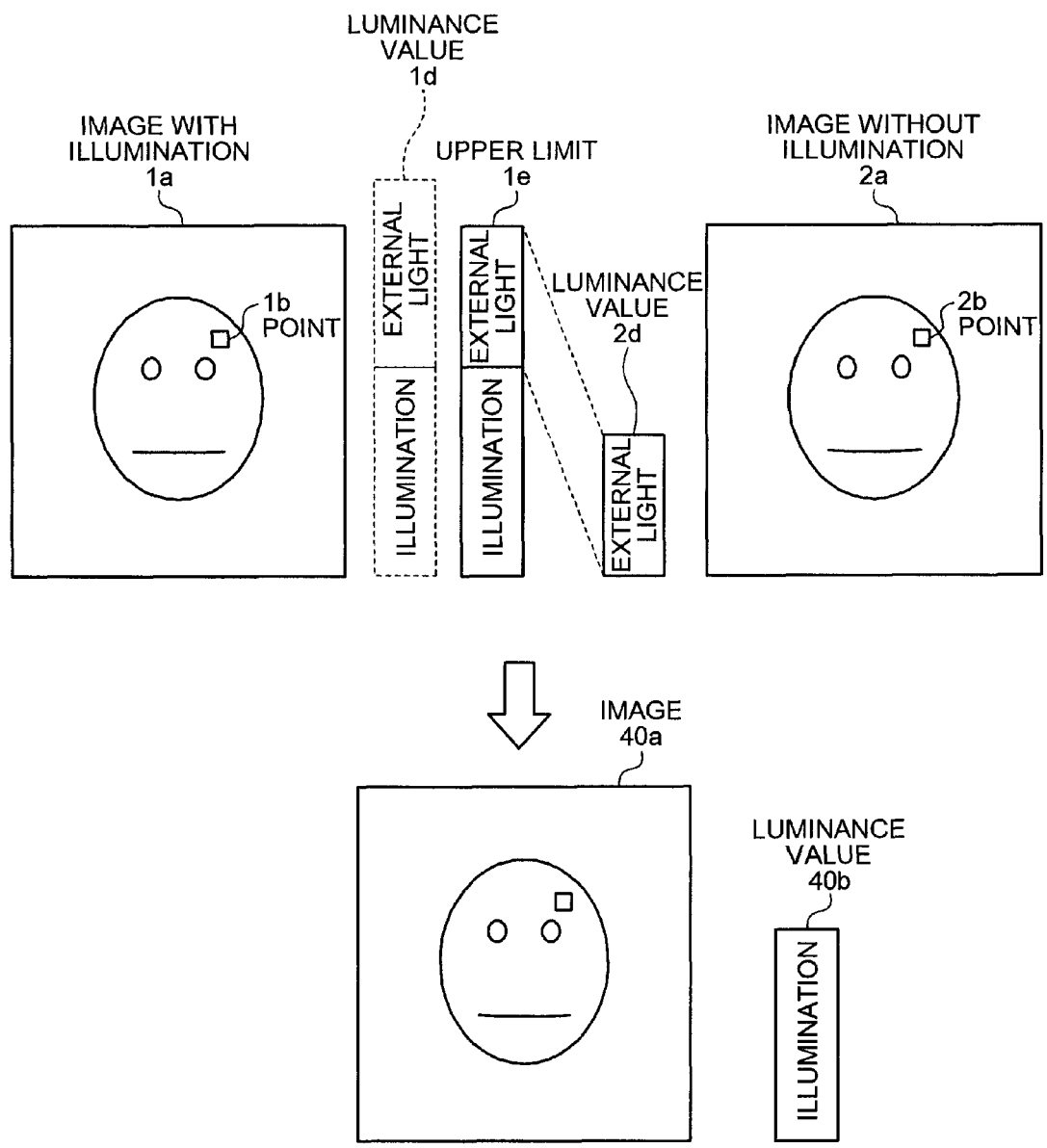

IMAGE FORMING APPARATUS, IMAGE FORMING METHOD, AND COMPUTER PROGRAM PRODUCT

BACKGROUND OF THE INVENTION

1. Field of the Invention

The present invention relates to an image forming apparatus, an image forming method, and a computer program product.

2. Description of the Related Art

Research is being carried out worldwide on a technique to form an image by removing external light even when a photogenic subject is illuminated in an environment that includes the external light. Conventional image forming methods that employ the above technique are disclosed in Japanese Patent Laid-Open Application Nos. 2002-10030 and 2003-187230. In these methods, in the environment that includes the external light, an image of the photogenic subject is taken by switching off the illumination to acquire an image without illumination, an image of the photogenic subject is taken by switching on the illumination to acquire an image with illumination, and a luminance value of each point of the image without illumination is subtracted from a luminance value of each point of the image with illumination to form an image without the external light.

The conventional technique is explained in detail with reference to FIG. 19. As shown in FIG. 19, an image processor subtracts a luminance value $2c$ of a point $2b$ of an image without illumination $2a$ from a luminance value $1c$ of a point $1b$ of an image with illumination $1a$ to form an image $30a$ having a luminance value $30b$. By carrying out a similar process for each point, the image processor forms the image without the external light. Alternatively, a light modulation method is known that carries out the method at hardware level inside an imaging device.

However, in the conventional technique, if the external light is strong, an image having an accurate luminance value of the illumination cannot be formed. In other words, because the luminance value of the image includes an upper limit, if the external light is strong, i.e., exceeds the upper limit, all the luminance values become equal to the fixed upper limit, and the image processor subtracts the luminance values of the external light from the upper limit instead of subtracting the luminance values of the external light from the original luminance values. Due to this, the luminance values of the illumination are eliminated at some points and the image having the accurate luminance value of the illumination cannot be formed.

This problem is explained in detail with reference to FIG. 20. As shown in FIG. 20, for example, if the external light is strong, the image processor subtracts a luminance value $2d$ of the point $2b$ of the image without illumination $2a$ from an upper limit $1e$ instead of subtracting the luminance value $2d$ from an original luminance value $1d$ of the point $1b$ of the image with illumination $1a$. Thus, an image $40a$ having an inaccurate luminance value $40b$ is formed. Moreover, in the conventional light modulation method, the structure of the imaging device becomes complicated and costly.

SUMMARY OF THE INVENTION

It is an object of the present invention to at least partially solve the problems in the conventional technology.

According to an aspect of the present invention, an image forming apparatus that causes an imaging unit to acquire a first image of a photogenic subject by illuminating the photogenic subject with external light and with light of an illuminating unit and acquires a second image by illuminating the photogenic subject with only the external light, and subtracts luminance values of the second image from those of the first image thereby obtaining a luminance difference image that include only luminance values corresponding to the light of the illuminating unit includes an imaging controller that controls the illuminating unit and the imaging unit to split a predetermined exposure time into a plurality of split exposure times and to acquire, for each split exposure time or by selecting a part of the desired split exposure time, the first image and the second image; a calculating unit that subtracts the luminance values of the second images from those of the first images that are acquired by the imaging controller thereby obtaining a luminance difference image for each split exposure time; and an integrating unit that integrates the luminance difference images thereby forming an integrated image in which only the luminance values of the illumination are integrated.

According to another aspect of the present invention, a method of acquiring, using an imaging unit, a first image of a photogenic subject by illuminating the photogenic subject with external light and with light of an illuminating unit and acquires a second image by illuminating the photogenic subject with only the external light, and subtracts luminance values of the second image from those of the first image thereby obtaining a luminance difference image that include only luminance values corresponding to the light of the illuminating unit, includes controlling the illuminating unit and the imaging unit to split a predetermined exposure time into a plurality of split exposure times and to acquire, for each split exposure time or by selecting a part of the desired split exposure time, the first image and the second image; subtracting the luminance values of the second image from those of the first image thereby forming a luminance difference image for each split exposure time; and integrating the luminance difference images for all the split exposure times thereby forming an integrated image in which only the luminance values of the illumination are integrated.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 2A to 2C are schematics for explaining an operation of the image forming apparatus shown in FIG. 1;

FIG. 3 is a block diagram of the image forming apparatus shown in FIG. 1;

FIG. 11 is an example of contents of a table storage unit shown in FIG. 10;

FIG. 16 is a schematic for explaining an example of how a material can be determined;

FIGS. 19 and 20 are schematics for explaining a conventional technology.

DETAILED DESCRIPTION OF THE PREFERRED EMBODIMENTS

Exemplary embodiments of the present invention are explained below with reference to the accompanying drawings.

First, the main terminology used in the embodiments is explained below. "Luminance value" indicates a grayscale value of each pixel that is acquired by an imaging unit. To be specific, luminance values indicate levels of an electric potential output by an imaging element of the imaging unit when the imaging element is exposed to light. For example, when the lower limit of the electric potential is taken as zero, the upper limit is taken as an appropriate potential value, and a number of grayscales is set to "256" (a gradation of 256 levels from black having a grayscale value "0" to white having a grayscale value "255"), in a pixel having the electric potential that exceeds the upper limit, all the grayscale values are substituted to white having a grayscale value "255" (jump to white).

For using an image in a process for a specific purpose, an imaging unit is used to acquire the image using only reflected light due to illumination in an environment without any influence of the external light. When acquiring the image, "predetermined exposure time" indicates a standard time period from an instant when the light falls on the imaging elements of the imaging unit until sufficient accumulation of a luminance value that is necessary for the process on the image. For example, for using a facial image in a matching process in face verification that is a part of biometrics, an illuminating unit illuminates a person, and the imaging unit acquires the facial image of the person using only the reflected light due to illumination in the environment without any influence of the external light. When acquiring such a facial image, the predetermined exposure time indicates the standard time period from the instant when the light falls on the imaging elements of the imaging unit until accumulation of the luminance value that is necessary for the matching process on the facial image.

Figure 1:
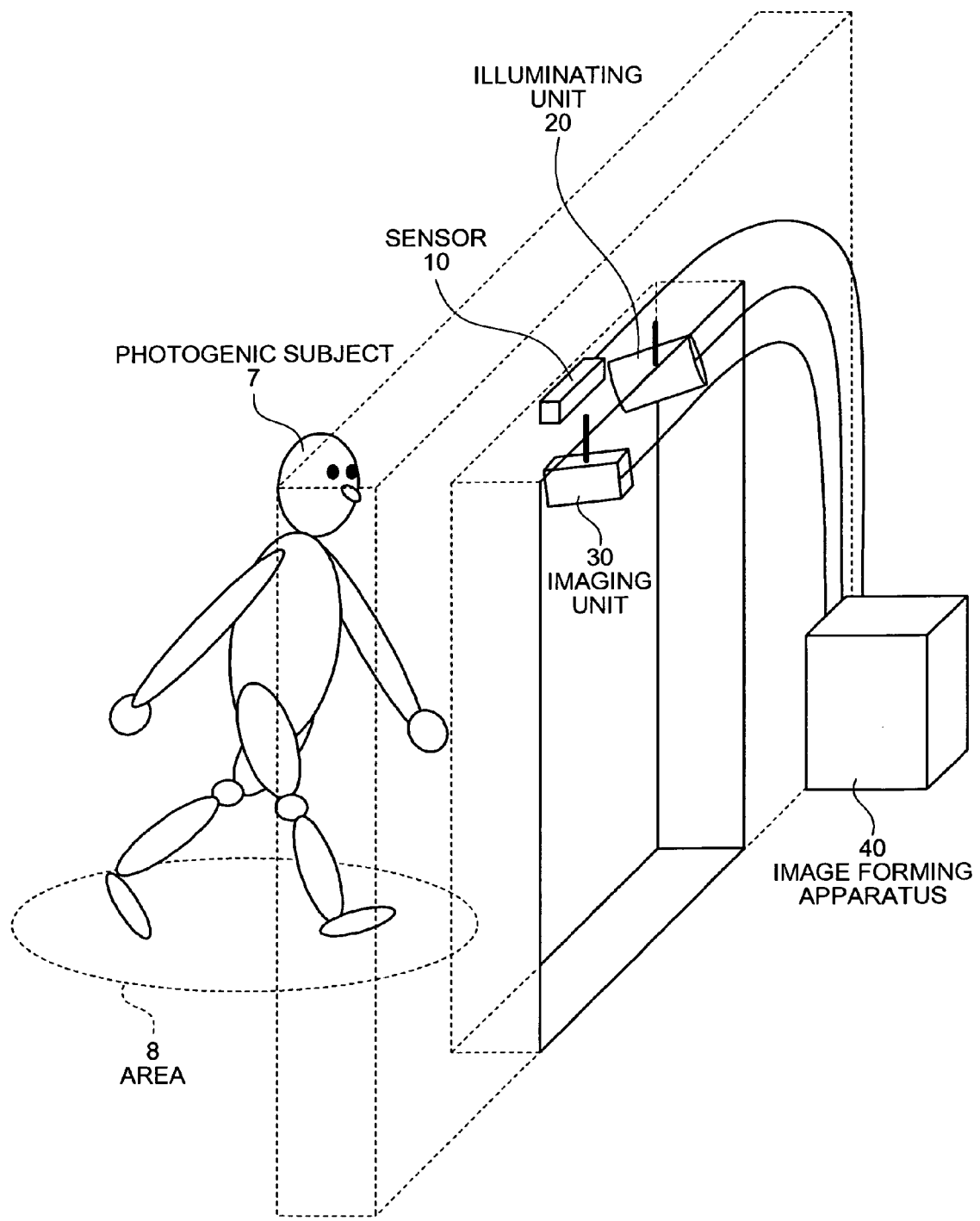
FIG. 1 is a schematic for explaining use of an image forming apparatus according to a first embodiment of the present invention.
Figure 2B:
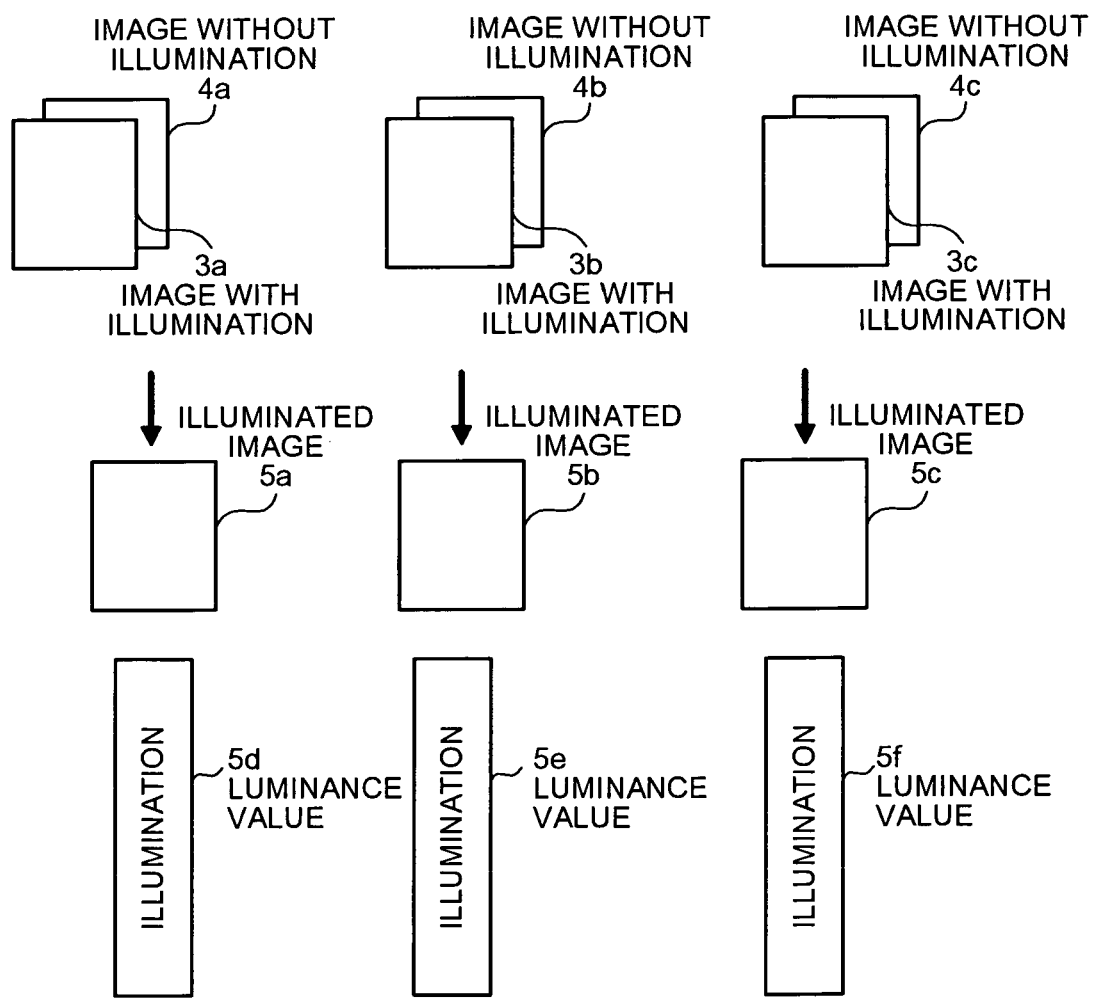
Figure 2C:
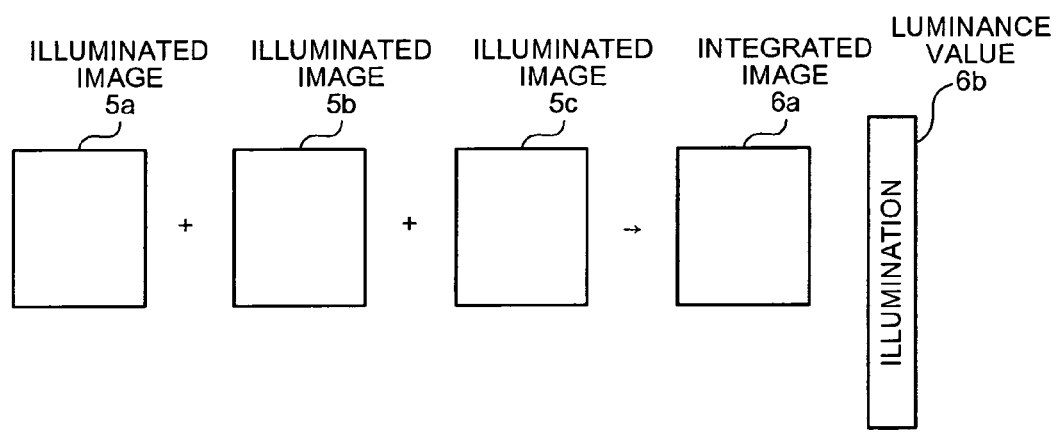

The outline and the salient feature of an image forming apparatus 40 according to the first embodiment are explained next with reference to FIG. 1 and FIGS. 2A to 2C. FIG. 1 is a schematic for explaining use of the image forming apparatus 40. FIGS. 2A to 2C are schematics for explaining an operation of the image forming apparatus 40.

As shown in FIG. 1, the image forming apparatus 40 is used at a certain facility such as school or airport building. The image forming apparatus 40 is connected to a sensor 10, an illuminating unit 20, and an imaging unit 30. The sensor 10, the illuminating unit 20, and the imaging unit 30 are fixed at an upper portion of an entrance and faces toward an area 8 through which a photogenic subject 7, which can be a person, enters the facility. The sensor 10 detects the photogenic subject 7 entering the area 8. The illuminating unit 20 illuminates the face of the photogenic subject 7 and the imaging unit 30 takes an image of the photogenic subject 7 who has entered the area 8.

In the image forming apparatus 40, the imaging unit 30 acquires two images of the photogenic subject 7: an image with (external) illumination while the photogenic subject 7 is illuminated by an external light and the light of the illuminating unit 20, and an image without (external) illumination while the photogenic subject 7 is illuminated only by the external light. The imaging unit 30 subtracts the luminance values of the image without illumination from the luminance values of the image with illumination to form an image that includes only the luminance value of the external illumination. Thus, the image that includes only the accurate luminance value can be easily formed even if the external light is strong.

The image forming apparatus 40 splits the predetermined exposure time into multiple split exposure times, and controls the illuminating unit 20 and the imaging unit 30 in each split exposure time thereby acquiring the image with illumination and the image without illumination.

For example, as shown in FIG. 2A, the image forming apparatus 40 controls the illuminating unit 20 and the imaging unit 30 to equally split the predetermined exposure time into three exposure times (hereinafter, "split number") and use the split exposure times to acquire three images with illumination 3a to 3c and three images without illumination 4a to 4c. Luminance values 3d to 3f in pixels of the images with illumination 3a to 3c respectively include a combination of the illumination and the external light. Luminance values 4d to 4f in pixels that are in the same location as the pixels in the images without illumination 4a to 4c only include the external light.

Next, the image forming apparatus 40 subtracts the luminance values 4d to 4f of the images without illumination 4a to 4c from the luminance values 3d to 3f of the images with illumination 3a to 3c that are acquired for each split exposure time and forms illuminated images for all the split numbers.

For example, as shown in FIG. 2B, the image forming apparatus 40 subtracts the luminance values in each pixel in the images without illumination 4a to 4c from the luminance values of each pixel in the images with illumination 3a to 3c and forms illuminated images 5a to 5c. Luminance values in pixels that are in the same location as the pixels in the illuminated images 5a to 5c take the values the external light component of luminance values shown as luminance values 5d to 5f, which are luminance values from which luminance values due to the external illumination has been removed.

Finally, the image forming apparatus 40 integrates the multiple illuminated images to form an integrated image that only includes an integrated luminance value of illumination.

For example, as shown in FIG. 2C, the image forming apparatus 40 integrates all the illuminated images 5a to 5c to form an integrated image 6a. Due to this, a luminance value 6b in pixels that are in the same location as the pixels inside the integrated image 6a becomes equal to a luminance value of the image that is acquired by using only the illumination of the illuminating unit 20 during the predetermined exposure time.

Thus, the image forming apparatus 40 according to the first embodiment can form the image that only includes the accurate luminance value of the illumination even if the external light is strong.

FIG. 3 is a block diagram of the image forming apparatus 40. The image forming apparatus 40 is connected to the sensor 10, the illuminating unit 20, and the imaging unit 30. The image forming apparatus 40 includes a controller 50 and a storage unit 60.

The sensor 10 detects the entry of the photogenic subject 7, thereby starting a process of the image forming apparatus 40. To be specific, the sensor 10 constantly emits infrared light in a fixed direction. Upon receiving reflected light of the infrared light that is reflected by the photogenic subject 7, the sensor 10 outputs to the image forming apparatus 40 signals that instruct the image forming apparatus 40 to start taking an image.

The illuminating unit 20 illuminates the photogenic subject 7 while being controlled by an imaging controller 51. To be specific, the illuminating unit 20 is fixed in a studio at a location that enables the illuminating unit 20 to uniformly illuminate the photogenic subject 7. Based on the control by the imaging controller 51, the illuminating unit 20 turns on and turns off the illumination.

The imaging unit 30 takes an image of the photogenic subject 7 while being controlled by the imaging controller 51, and acquires the facial image of the photogenic subject 7. To be specific, the imaging unit 30 is fixed in the studio at a location that enables the imaging unit 30 to take the image such that the face of the photogenic subject 7 is included in the center inside a frame. Similarly as the illuminating unit 20, the imaging unit 30 takes the image of the photogenic subject 7 while being controlled by the imaging controller 51 that is described later and acquires the image with illumination and the image without illumination. The imaging unit 30 outputs the acquired image with illumination to an image with illumination storage unit 61 that is explained later and outputs the acquired image without illumination to an image without illumination storage unit 62 that is explained later.

The storage unit 60 stores therein data and computer programs that are necessary for various processes of the controller 50. The storage unit 60 includes the image with illumination storage unit 61, the image without illumination storage unit 62, an illuminated image storage unit 63, and an integrated image storage unit 64. The image with illumination storage unit 61 and the image without illumination storage unit 62 are connected to the imaging unit 30.

Based on the images that are acquired by controlling the illuminating unit 20 and the imaging unit 30, the controller 50 executes various processes. The controller 50 includes the imaging controller 51, an illuminated image forming unit 52, and an illuminated image integrating unit 53 that are closely related to the present invention. The imaging controller 51, the illuminated image forming unit 52, and the illuminated image integrating unit 53 correspond respectively to, for example, "imaging controller", "calculating unit", and "integrating unit" that are described in scope of the claims.

The imaging controller 51 controls the illuminating unit 20 and the imaging unit 30 to split the predetermined exposure time into multiple split exposure times and to acquire the image with illumination and the image without illumination for each split exposure time. To be specific, upon receiving from the sensor 10 the signal to start taking an image, the imaging controller 51 controls the illuminating unit 20 and the imaging unit 30 to equally split the predetermined exposure time into the exposure times by the split number set by default and to acquire the same number of the images with illumination and the images without illumination as the split number.

For example, if "3" is set as the split number by default, as shown in FIG. 2A, the imaging controller 51 controls the illuminating unit 20 and the imaging unit 30 to equally split the predetermined exposure time into three split exposure times and to acquire the three images with illumination 3a to 3c and the three images without illumination 4a to 4c. The images with illumination 3a to 3c that are acquired by the imaging unit 30 are stored in the image with illumination storage unit 61 and the images without illumination 4a to 4c acquired by the imaging unit 30 are stored in the image without illumination storage unit 62.

The image with illumination storage unit 61 stores therein the images with illumination 3a to 3c acquired by the imaging unit 30. To be specific, the image with illumination storage unit 61 sequentially receives the images with illumination 3a to 3c from the imaging unit 30 and controls the images with illumination 3a to 3c in a time series.

The image without illumination storage unit 62 stores therein the images without illumination 4a to 4c that are acquired by the imaging unit 30. To be specific, similarly as the image with illumination storage unit 61, the image without illumination storage unit 62 sequentially receives the images without illumination 4a to 4c from the imaging unit 30 and controls the images without illumination 4a to 4c in a time series.

The illuminated image forming unit 52 subtracts the luminance values of the images without illumination from the luminance values of the images with illumination that are acquired due to control by the imaging controller 51 for each split exposure time and forms the illuminated images. To be specific, upon the image with illumination storage unit 61 and the image without illumination storage unit 62 storing the same number of the images as the split number, the illuminated image forming unit 52 reads one image with illumination from the image with illumination storage unit 61 and reads one image without illumination from the image without illumination storage unit 62, subtracts the luminance values of the image without illumination from the luminance values of the image with illumination to form an illuminated image, and outputs the formed illuminated image to the illuminated image storage unit 63.

For example, as shown in FIG. 2B, when the images with illumination 3a to 3c are sequentially stored in the image with illumination storage unit 61 and the images without illumination 4a to 4c are sequentially stored in the image without illumination storage unit 62, the illuminated image forming unit 52 reads the image with illumination 3a from the image with illumination storage unit 61, reads the image without illumination 4a from the image without illumination storage unit 62, subtracts the luminance value of the image without illumination 4a from the luminance value of the image with illumination 3a to form the illuminated image 5a, and outputs the formed illuminated image 5a to the illuminated image storage unit 63. The illuminated image forming unit 52 carries out a similar process on the images with illumination 3b and 3c and the images without illumination 4b and 4c.

The illuminated image storage unit 63 stores therein the illuminated images that are formed by the illuminated image forming unit 52. To be specific, the illuminated image storage unit 63 sequentially receives the illuminated images and controls the received illuminated images in a time series.

The illuminated image integrating unit 53 integrates the multiple illuminated images that are formed by the illuminated image forming unit 52 to form the integrated image that only includes the luminance value of the illumination. To be specific, upon the illuminated image storage unit 63 storing the same number of the illuminated images as the split number, the illuminated image integrating unit 53 sequentially reads the illuminated images from the illuminated image storage unit 63, integrates the same number of the illuminated images as the split number set by default to form a single integrated image, and outputs the formed integrated image to the integrated image storage unit 64 that is explained later.

For example, as shown in FIG. 2C, if the illuminated images 5a to 5c are stored in the illuminated image storage unit 63, the illuminated image integrating unit 53 uses the split number "3" that is set by default to integrate the three illuminated images 5a to 5c to form the integrated image 6a, and outputs the formed integrated image 6a to the integrated image storage unit 64.

The integrated image storage unit 64 stores therein the integrated image that is formed by the illuminated image integrating unit 53. To be specific, the integrated image storage unit 64 sequentially receives the illuminated images from the illuminated image integrating unit 53 and controls the illuminated images in a time series.

Figure 4:
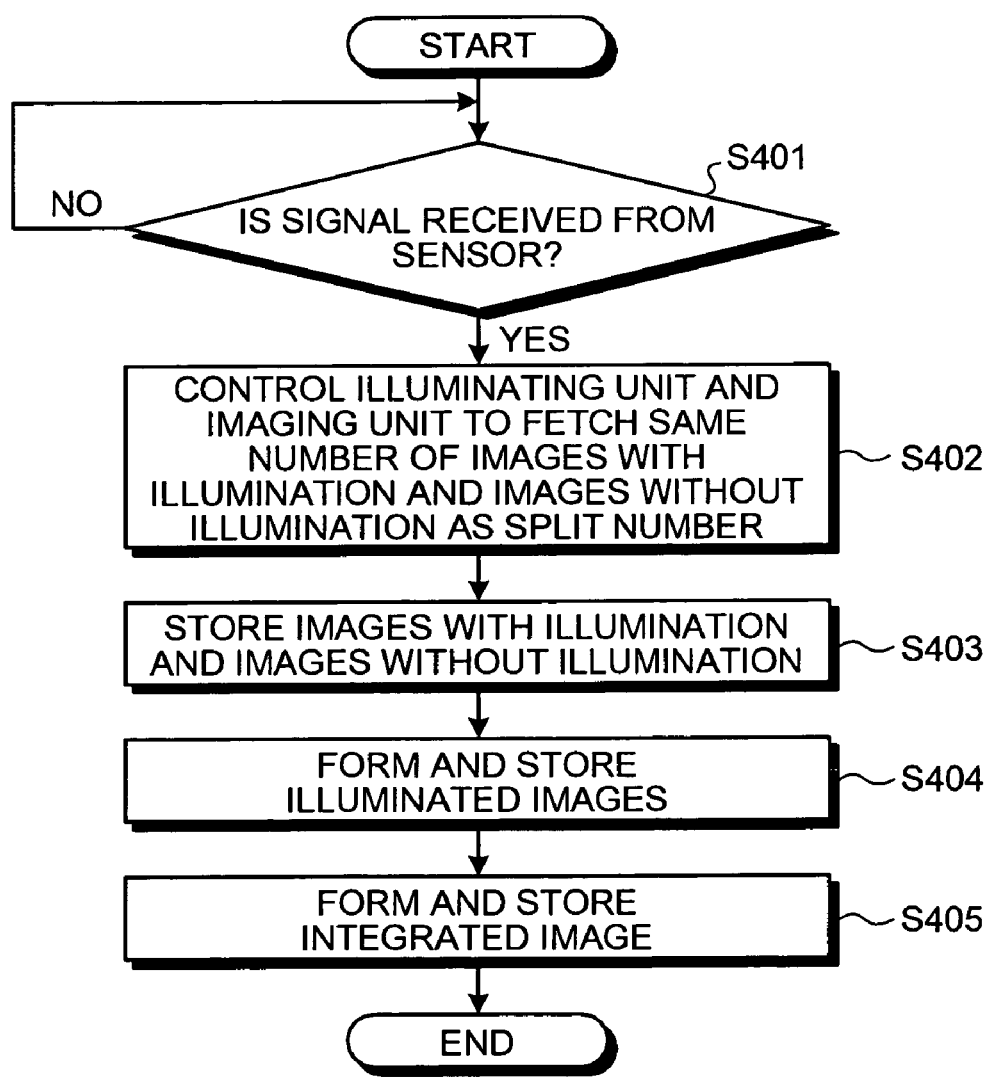
FIG. 4 is a flowchart of an image forming process performed by the image forming apparatus shown in FIG. 1.

FIG. 4 is a flowchart of an image forming process performed by the image forming apparatus 40.

First, upon receiving from the sensor 10 the signal to start taking an image (Yes at step S401), the imaging controller 51 of the image forming apparatus 40 controls the illuminating unit 20 and the imaging unit 30, and causes the imaging unit 30 to equally split the predetermined exposure time into the split number set by default to get the split exposure times and use the split exposure times to acquire the same number of the images with illumination and the images without illumination as the split number (step S402).

Next, the imaging unit 30 stores the images with illumination and the images without illumination into the image with illumination storage unit 61 and the image without illumination storage unit 62 respectively (step S403). Upon reading the images with illumination and the images without illumination from the image with illumination storage unit 61 and the image without illumination storage unit 62 respectively, the illuminated image forming unit 52 subtracts the luminance values of the images without illumination from the luminance values of the images with illumination to form the illuminated images, and stores the formed illuminated images in the illuminated image storage unit 63 (step S404). Upon reading the illuminated images from the illuminated image storage unit 63, the illuminated image integrating unit 53 integrates the formed multiple illuminated images to form the integrated image, stores the formed integrated image in the integrated image storage unit 64 (step S405), and ends the process.

According to the first embodiment, the image forming apparatus controls the illuminating unit and the imaging unit to split the predetermined exposure time into multiple split exposure times and to acquire the image with illumination and the image without illumination for each split exposure time, subtracts the luminance values of the image without illumination from the luminance values of the image with illumination that is acquired for each split exposure time to form the illuminated image for each split exposure time, and integrates the formed multiple illuminated images to form the integrated image that only includes the luminance value of the illumination. Thus, the image that only includes the accurate luminance value of the illumination can be easily formed even if the external light is strong.

Furthermore, all the multiple illuminated images that are formed are integrated to form the integrated image. Thus, the image can be formed that includes the same luminance value as the luminance value of the image that is acquired by illuminating the photogenic subject using the illuminating unit and taking the image of the photogenic subject in the predetermined exposure time.

Use of the split number that is set by default to acquire the image with illumination and the image without illumination is explained in the first embodiment. A method to calculate the split number according to external light intensity and using the calculated split number to acquire the image with illumination and the image without illumination is explained in a second embodiment of the present invention.

Figure 5:
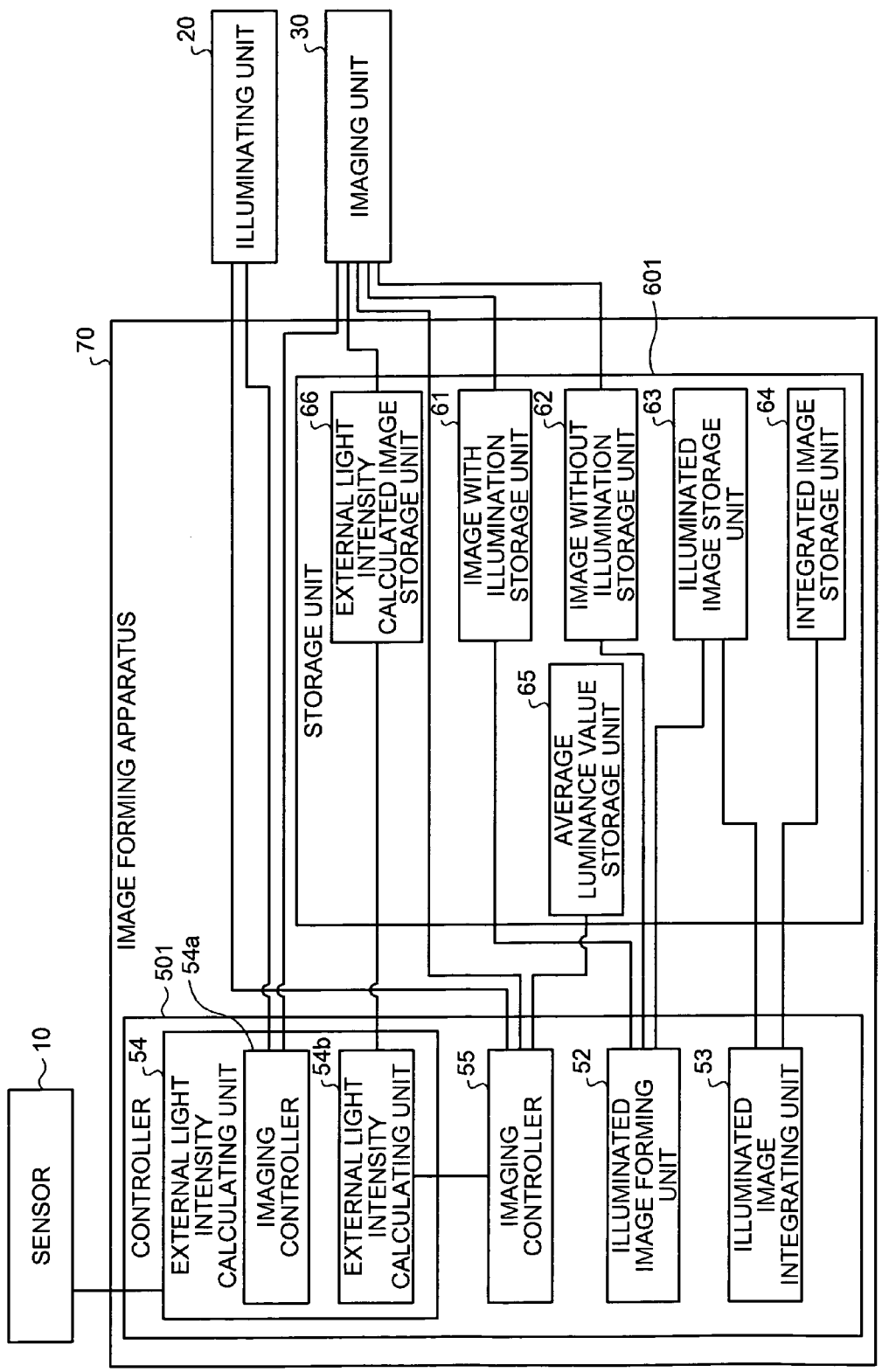
FIG. 5 is a block diagram of an image forming apparatus according to a second embodiment of the present invention.

FIG. 5 is a block diagram of an image forming apparatus 70 according to the second embodiment. The image forming apparatus 70 is connected to the sensor 10, the illuminating unit 20, and the imaging unit 30, and includes a controller 501 and a storage unit 601. Functioning units that carry out the same operations as the operations of the respective functioning units in the first embodiment are indicated by the same reference numerals and an explanation is omitted. Only an external light intensity calculating unit 54, an imaging controller 55, an average luminance value storage unit 65, and an external light intensity calculated image storage unit 66 are explained below. The external light intensity calculating unit 54 corresponds to "external light intensity calculating unit" of the scope of the claims and includes an imaging controller 54a and an external light intensity calculating unit 54b.

The average luminance value storage unit 65 stores therein an average luminance value that is necessary for calculating the split number. To be specific, when the facial image is prior acquired by taking an image of a random photogenic subject in the predetermined exposure time using only the illumination of the illuminating unit 20, the average luminance value storage unit 65 stores therein the average luminance value inside a predetermined area in the facial image. Moreover, to prevent jump to white, selecting the worst case (the highest average luminance value) among the prior acquired facial images of multiple photogenic subjects and storing the selected average luminance value is desirable.

Figure 6:
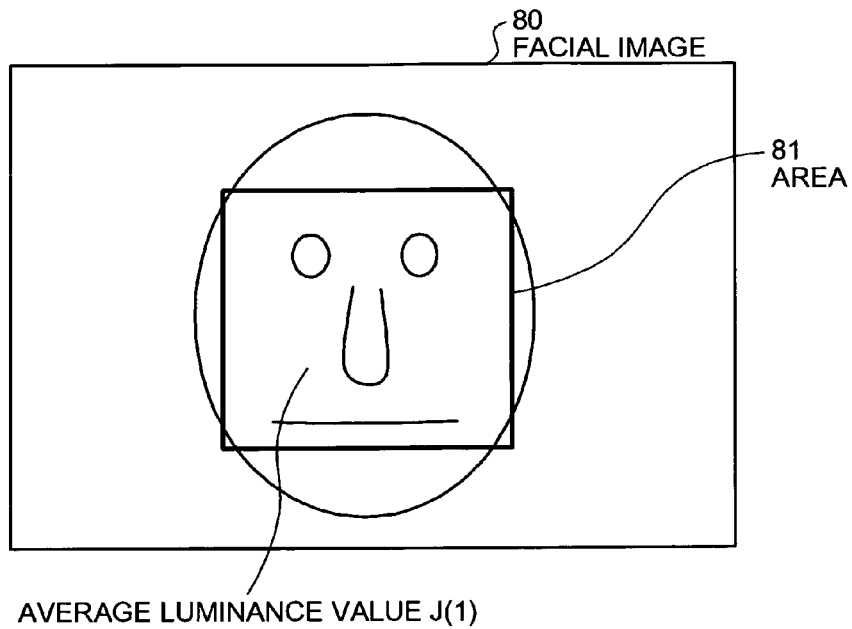
FIG. 6 is a schematic for explaining the calculation of an average luminance value.

For example, as shown in FIG. 6, the average luminance value storage unit 65 stores therein an average luminance value J(1) that is an average of luminance values included in each pixel inside an area 81 of a facial image 80. The average luminance value J(1) is prior calculated by prior acquiring the facial image 80 using the illuminating unit 20 and the imaging unit 30, and stored in the average luminance value storage unit 65.

The external light intensity calculating unit 54 controls the illuminating unit 20 and the imaging unit 30 to equally split the predetermined exposure time into the exposure times by the predetermined split number, use the split exposure times to acquire external light images of the photogenic subject 7 that is illuminated only by the external light, calculate the average luminance value of the predetermined area of the acquired external light images, and multiply the average luminance value with the predetermined split number to calculate the external light intensity.

To be specific, upon receiving from the sensor 10 the signal to start taking the image, the imaging controller 54a of the external light intensity calculating unit 54 controls the illuminating unit 20 and the imaging unit 30 to equally split the predetermined exposure time into the exposure times by the split number set by default, and use the split exposure times to acquire the images without illumination (the images without illumination acquired by the imaging unit 30 are stored as external light intensity calculated images in the external light intensity calculated image storage unit 66 that is explained later). Next, the external light intensity calculating unit 54b of the external light intensity calculating unit 54 reads the external light intensity calculated images from the external light intensity calculated image storage unit 66, multiplies the average luminance value inside the predetermined area of the external light intensity calculated images with the split number to calculate the external light intensity, and outputs the calculated external light intensity to the imaging controller 55 that is explained later.

Figure 7:
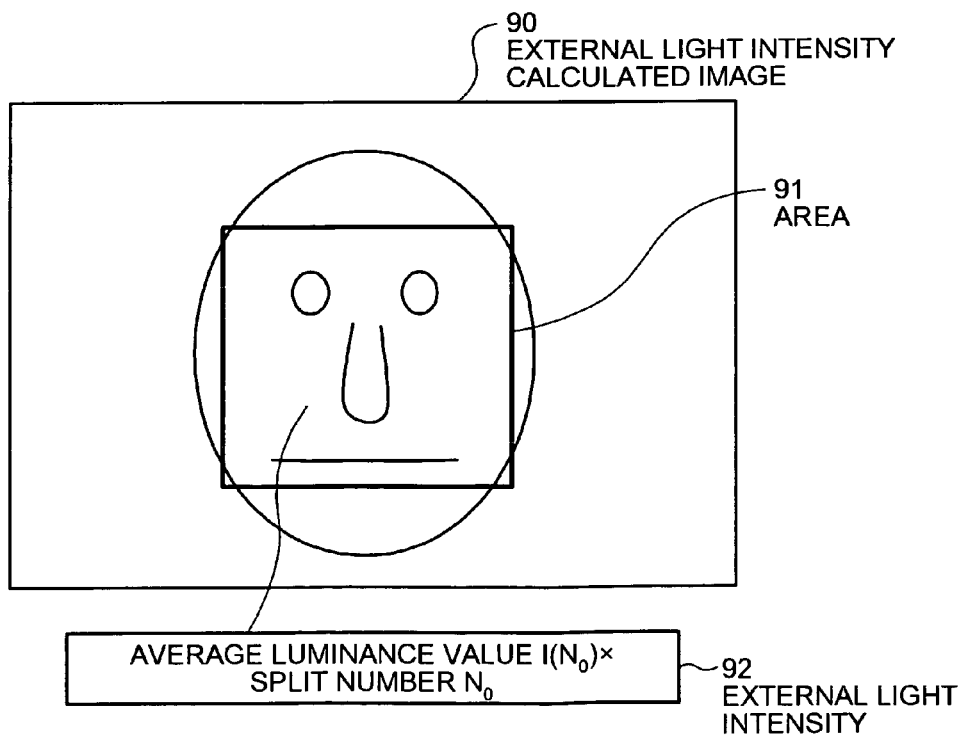
FIG. 7 is a schematic for explaining calculation of an external light intensity.

For example, as shown in FIG. 7, the imaging controller 54a of the external light intensity calculating unit 54 controls the imaging unit 30 to acquire an external light intensity calculated image 90 that includes an area 91. The external light intensity calculating unit 54b multiplies an average luminance value $I(N_0)$ that is an average of the luminance values included in each pixel inside the area 91 with a split number $N_0$ to calculate an external light intensity 92, and outputs the calculated external light intensity 92 to the imaging controller 55 that is explained later.

The external light intensity calculated image storage unit 66 stores therein the external light intensity calculated images that are acquired by the imaging unit 30 due to control by the imaging controller 54a. To be specific, the external light intensity calculated image storage unit 66 receives the external light intensity calculated images from the imaging unit 30 and stores the received external light intensity calculated images.

The imaging controller 55 determines as a minimum split number, the lowest integer which is equal to or more than a value that is calculated by dividing using a predetermined luminance value threshold, a sum of the external light intensity calculated by the external light intensity calculating unit 54 and the average luminance value of the predetermined area in the image acquired by illuminating the photogenic subject 7 using only the illumination of the illuminating unit 20 in the predetermined exposure time. The imaging controller 55 controls the illuminating unit 20 and the imaging unit 30 to equally split the predetermined exposure time using the minimum split number into split exposure times and use the split exposure times to acquire the same number of the images with illumination and the images without illumination as the minimum split number. The luminance value threshold indicates a prior set random value that is marginally less than the upper limit of the luminance value.

To be specific, upon receiving external light intensity $(I(N_0) \times N_0)$ from the external light intensity calculating unit 54, the imaging controller 55 reads the average luminance value J(1) from the average luminance value storage unit 65, and uses a conditional equation $(\{I(N_0) \times N_0 + J(1)\}/Th \leq N)$ for calculating a minimum split number N from the external light intensity $(I(N_0) \times N_0)$, the average luminance value J(1), and a luminance value threshold Th to calculate the minimum split number N. For example, if a value of the left portion in the equation is "3.5", "4" is determined as the minimum split number N. Next, the imaging controller 55 controls the illuminating unit 20 and the imaging unit 30 to equally split the predetermined exposure time using the minimum split number N into split exposure times, and use the split exposure times to acquire the same number of the images with illumination and the images without illumination as the minimum split number N.

Figure 8:
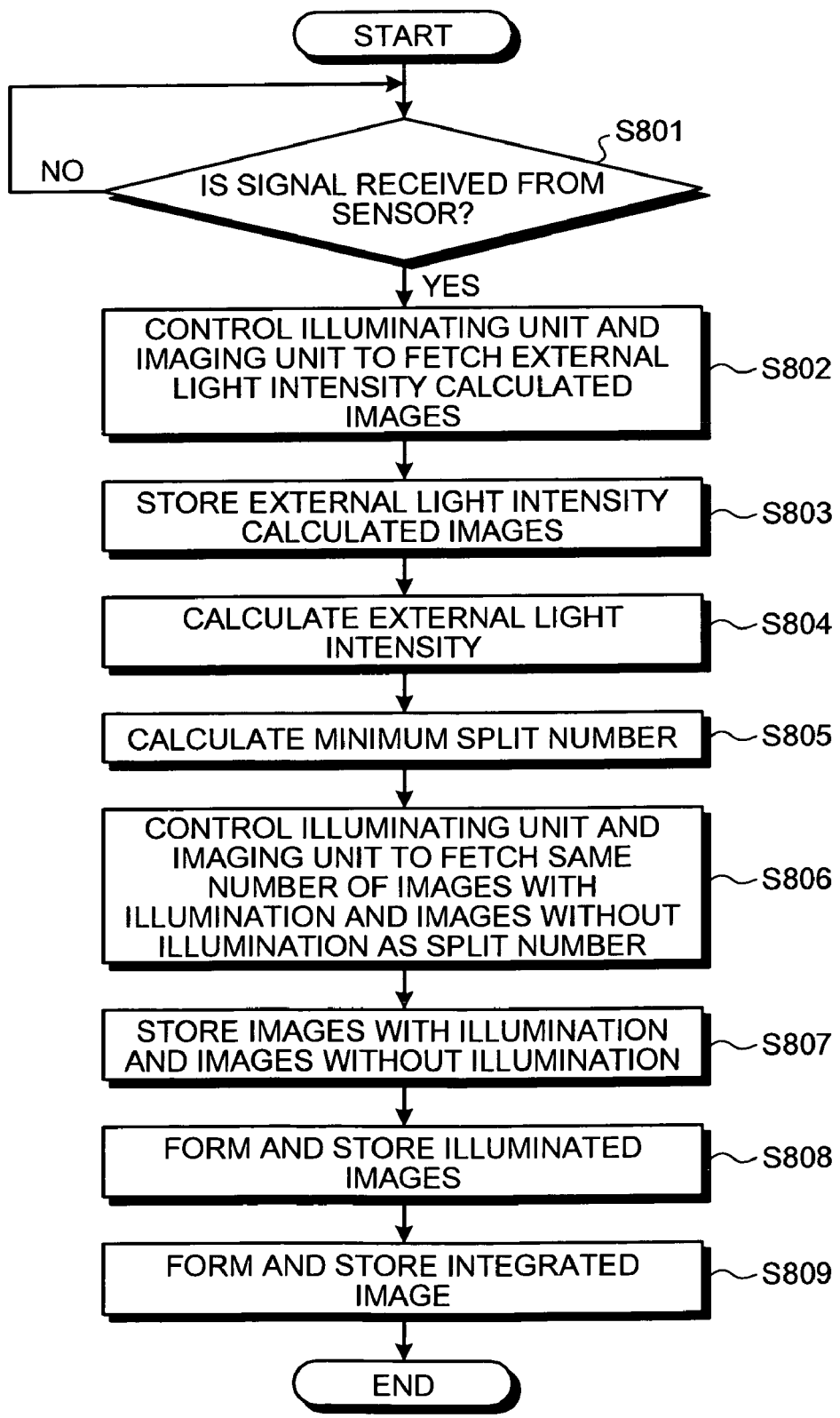
FIG. 8 is a flowchart of an image forming process performed by the image forming apparatus shown in FIG. 5.

FIG. 8 is a flowchart of an image forming process performed by the image forming apparatus 70.

First, upon receiving from the sensor 10 the signal to start taking the image (Yes at step S801), the external light intensity calculating unit 54 of the image forming apparatus 70 controls the illuminating unit 20 and the imaging unit 30 and causes the imaging unit 30 to acquire the external light intensity calculated images (step S802).

Next, the imaging unit 30 stores the external light intensity calculated images in the external light intensity calculated image storage unit 66 (step S803). The external light intensity calculating unit 54 reads the external light intensity calculated images from the external light intensity calculated image storage unit 66 and based on the external light intensity calculated images calculates the external light intensity (step S804).

Upon receiving the external light intensity from the external light intensity calculating unit 54, based on the average luminance value stored in the average luminance value storage unit 65 and the luminance value threshold, the imaging controller 55 calculates the minimum split number (step S805).

Because the minimum split number is calculated, similarly as in the first embodiment, the image forming apparatus 70 controls the imaging unit 30 to equally split the predetermined exposure time using the calculated minimum split number into split exposure times and use the split exposure times to acquire the same number of the images with illumination and the images without illumination as the split number (step S806). Based on the images with illumination and the images without illumination, the imaging unit 30 forms the integrated image, stores the integrated image in the integrated image storage unit 64 (step S807 to step S809), and ends the process.

In the second embodiment the split number is determined based on the external light intensity. Due to this, for example, when the external light is remarkably intense, the split number of the predetermined exposure time can be increased compared to when the external light is marginally intense. Thus, by flexibly adapting to a change of the external light the image that only includes the accurate luminance value of the illumination can be easily formed.

According to the second embodiment, the image forming apparatus controls the illuminating unit and the imaging unit to equally split the predetermined exposure time into the exposure times by the predetermined split number and to acquire the external light intensity calculated images using the split exposure time. The image forming apparatus calculates the average luminance value of the predetermined area of the acquired external light intensity calculated images and multiplies the average luminance value with the predetermined split number to calculate the external light intensity. Further, the image forming apparatus determines as the minimum split number, the lowest integer which is equal to or more than a value that is calculated by dividing using the predetermined luminance value threshold, the sum of the calculated external light intensity and the average luminance value of the predetermined area in the image acquired by illuminating the photogenic subject 7 using only the illumination of the illuminating unit in the predetermined exposure time. Next, the image forming apparatus controls the illuminating unit and the imaging unit to equally split the predetermined exposure time using the minimum split number into the split exposure times and use the split exposure times to acquire the same number of the images with illumination and the images without illumination as the minimum split number. Thus, compared to a method that directly measures the external light intensity from the external light, a necessity to newly include a device to measure the external light can be obviated and the image that only includes the accurate luminance value of the illumination can be easily formed. Moreover, compared to a method that splits the predetermined exposure time into different multiple exposure times, using a simple process to equally split the predetermined exposure time enables to enhance the process speed. Further, because the image is acquired using the minimum split number, a probability of noise entering during imaging can be reduced and the process speed can be increased.

Calculating the average luminance value inside the predetermined area of the external light intensity calculated images as the external light intensity and determining the minimum split number using calculation is explained in the second embodiment. In a method that is explained in a third embodiment of the present invention, the external light intensity is calculated directly from the external light and instead of calculation, a table that includes a correspondence between the external light intensity and the split number is referred to determine the split number.

Figure 9:
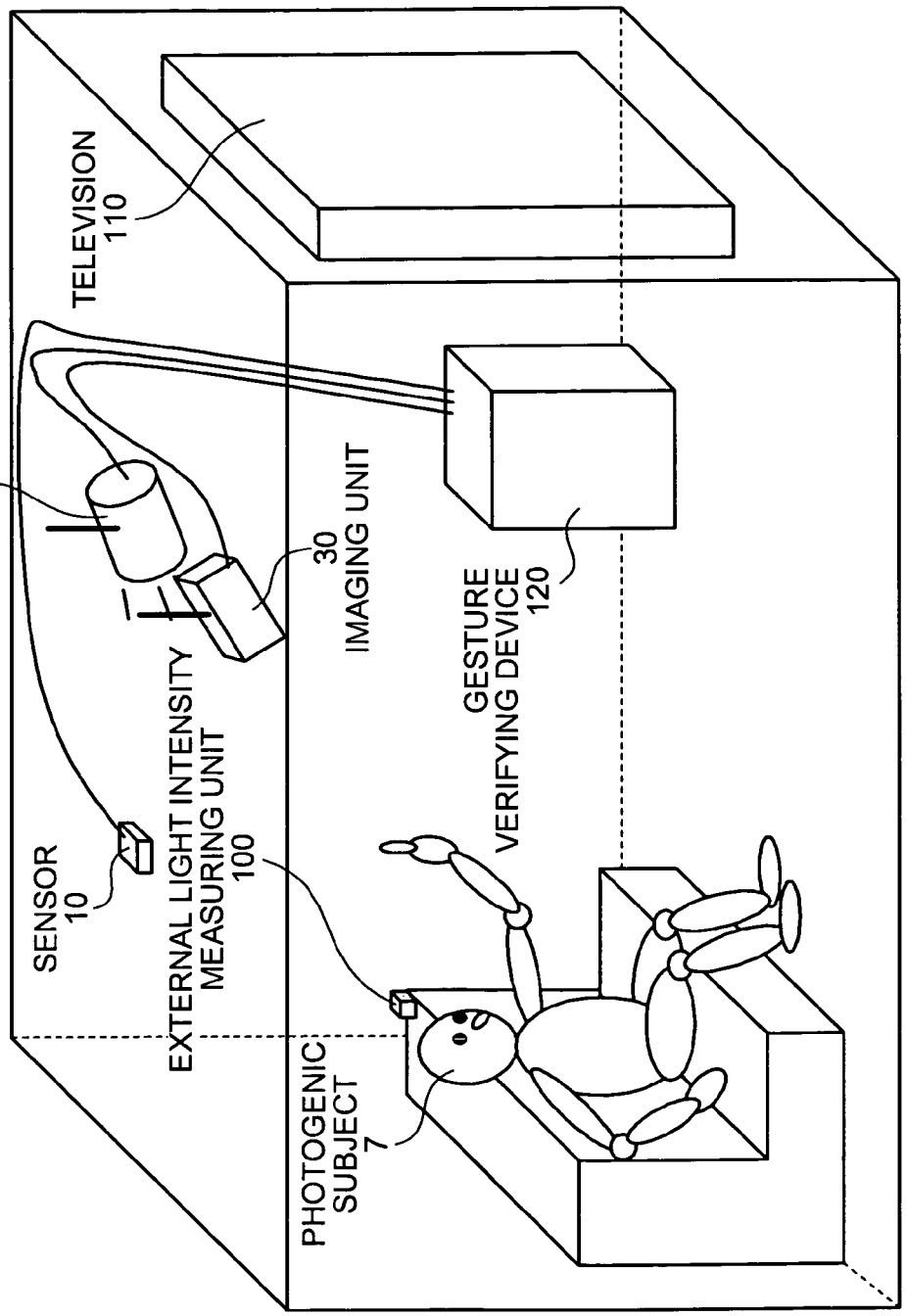
FIG. 9 is a schematic for explaining arrangement of a gesture verifying device according to a third embodiment of the present invention.

First, an outline of a gesture verifying device according to the third embodiment is explained with reference to FIG. 9. FIG. 9 is a schematic of the outline of the gesture verifying device.

As shown in FIG. 9, a gesture verifying device 120 according to the third embodiment is included at a predetermined location in a room and is connected to the sensor 10, the illuminating unit 20, the imaging unit 30, an external light intensity measuring unit 100, and a television 110. The sensor 10 is fixed immediately above a location of a hand of the photogenic subject 7 who makes a gesture by extending the hand in a forward direction. The illuminating unit 20 and the imaging unit 30 are fixed at locations that enable the illuminating unit 20 to illuminate the hand of the photogenic subject 7 and enable the imaging unit 30 to take an image of the hand of the photogenic subject 7 from an appropriate distance and angle. It is desirable to include the external light intensity measuring unit 100 at a location such that upon assuming that the room includes an illumination that differs from the illuminating unit 20 and a window, the location of the hand of the photogenic subject 7 should receive an influence equivalent to the influence due to light of the illumination and the external light from the window. In the third embodiment, the external light intensity measuring unit 100 is included at the location shown in FIG. 9.

Figure 10:
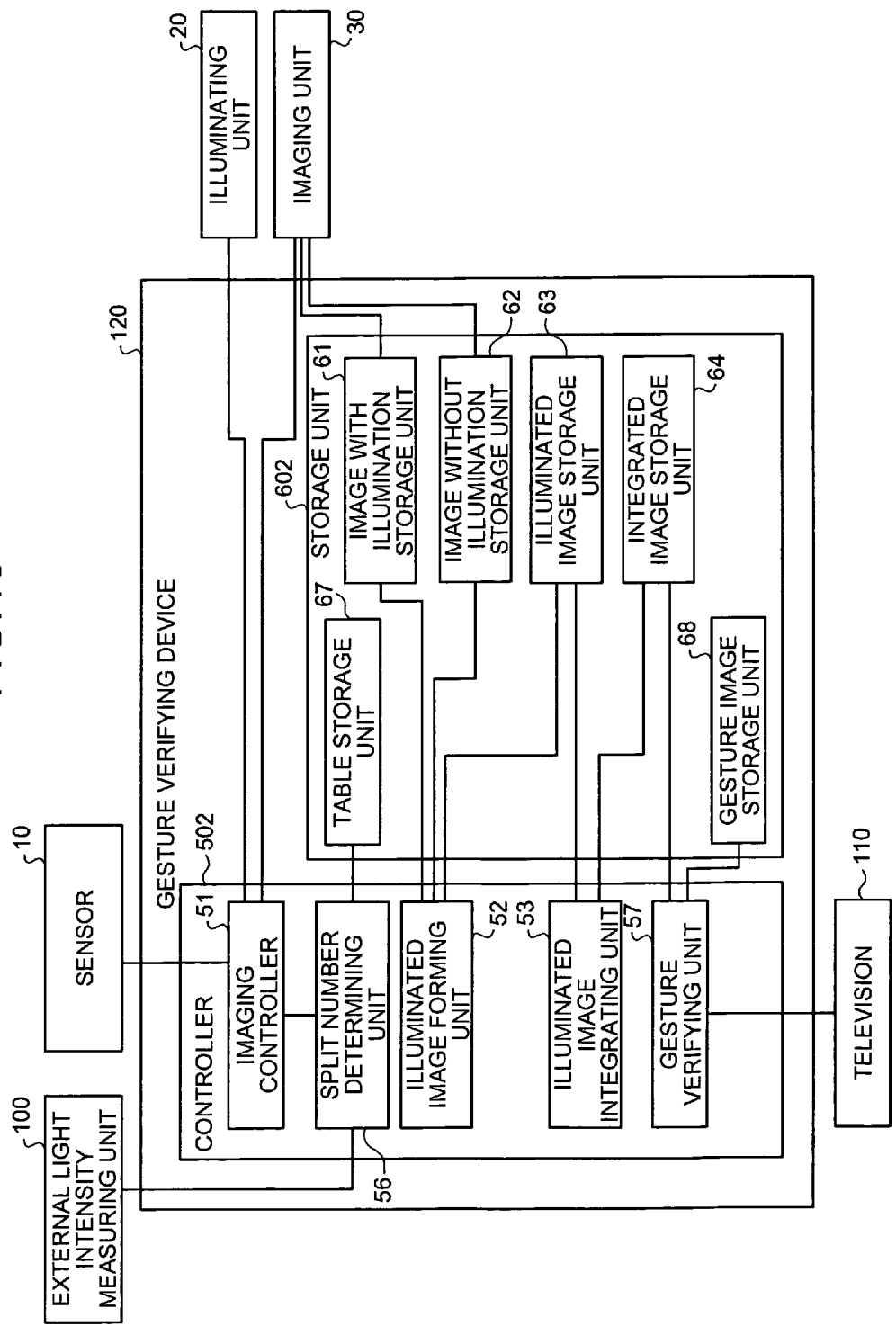
FIG. 10 is a block diagram of the gesture verifying device shown in FIG. 9.

FIG. 10 is a block diagram of the gesture verifying device 120. The gesture verifying device 120 is connected to the sensor 10, the illuminating unit 20, the imaging unit 30, the external light intensity measuring unit 100, and the television 110 and includes a controller 502 and a storage unit 602. Functioning units that carry out the same operations as the operations of the respective functioning units in the first embodiment or the second embodiment are indicated by the same reference numerals and an explanation is omitted. Only a split number determining unit 56, a gesture verifying unit 57, a table storage unit 67, and a gesture image storage unit 68 are explained below. The external light intensity measuring unit 100 and the table storage unit 67 correspond respectively to "external light intensity measuring unit" and "split number storage unit" that are described in the scope of the claims.

The table storage unit 67 establishes a correspondence between the external light intensity and the split number of the exposure time, and stores the established correspondence. To be specific, in the table storage unit 67, the assumed external light intensity is divided into several ranges and a correspondence between the external light intensity and the appropriate exposure time of the split number is stored for each range in the form of a table. For example, as shown in FIG. 11, the table storage unit 67 stores therein the table that includes as one of the ranges, a correspondence between the external light intensity "0 to 300 (Lx)" and the split number "0".

The external light intensity measuring unit 100 measures the external light intensity by receiving the external light. To be specific, the external light intensity measuring unit 100 is a semiconductor element (for example, a photodiode) that generates an electric charge and a potential according to an amount of the received external light. The external light intensity measuring unit 100 outputs at predetermined intervals output value of the generated electric charge and the potential to the split number determining unit 56 that is explained later.

The split number determining unit 56 reads from the table storage unit 67 the split number of the exposure time corresponding to the external light intensity that is measured by the external light intensity measuring unit 100. To be specific, upon receiving the external light intensity from the external light intensity measuring unit 100, the split number determining unit 56 reads from the table storage unit 67 the split number corresponding to the range that includes the external light intensity, and outputs the read split number to the imaging controller 51. Because the split number determining unit 56 receives the external light intensity from the external light intensity measuring unit 100 at the predetermined intervals, the split number determining unit 56 similarly outputs the split number to the imaging controller 51 at predetermined intervals.

Figure 12:
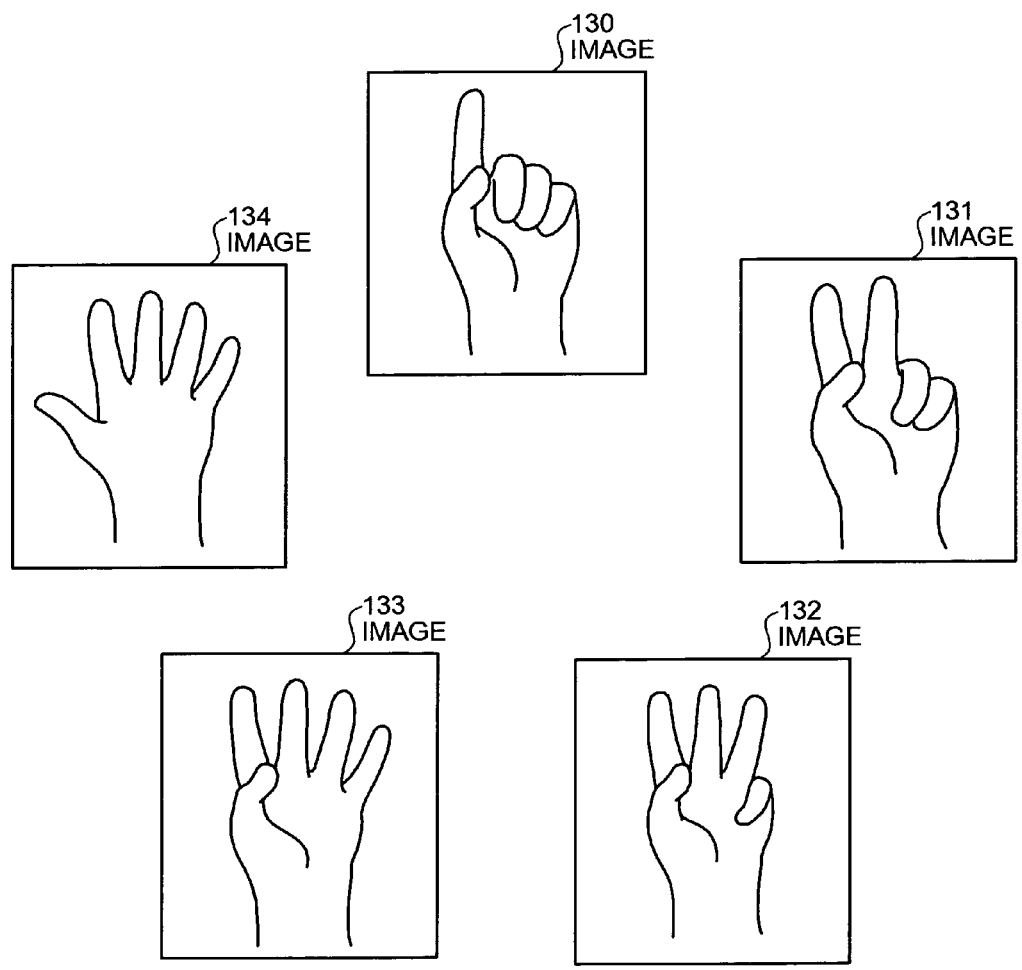
FIG. 12 is a schematic of an example of images stored in a gesture image storage unit shown in FIG. 10.

The gesture image storage unit 68 stores therein images of specific gestures. To be specific, the gesture image storage unit 68 stores therein the same types of multiple images related to the specific gestures as a number of channels of the television 110. For example, as shown in FIG. 12, the gesture image storage unit 68 stores therein an image 130 that is a gesture that generally represents the numeral "1" etc.

Based on the generated integrated image, the gesture verifying unit 57 verifies whether a gesture of the photogenic subject 7 is the specific gesture. To be specific, upon the integrated image storage unit 64 storing the integrated image, the gesture verifying unit 57 reads the integrated image from the integrated image storage unit 64 and matches the read integrated image with all the images stored in the gesture image storage unit 68. Upon confirming that the gesture of the photogenic subject 7 in the integrated image is the specific gesture, the gesture verifying unit 57 outputs to the television 110 a signal that instructs the television 110 to switch to the channel corresponding to the gesture. Upon receiving the signal from the gesture verifying unit 57, the television 110 switches to the instructed channel.

Figure 13:
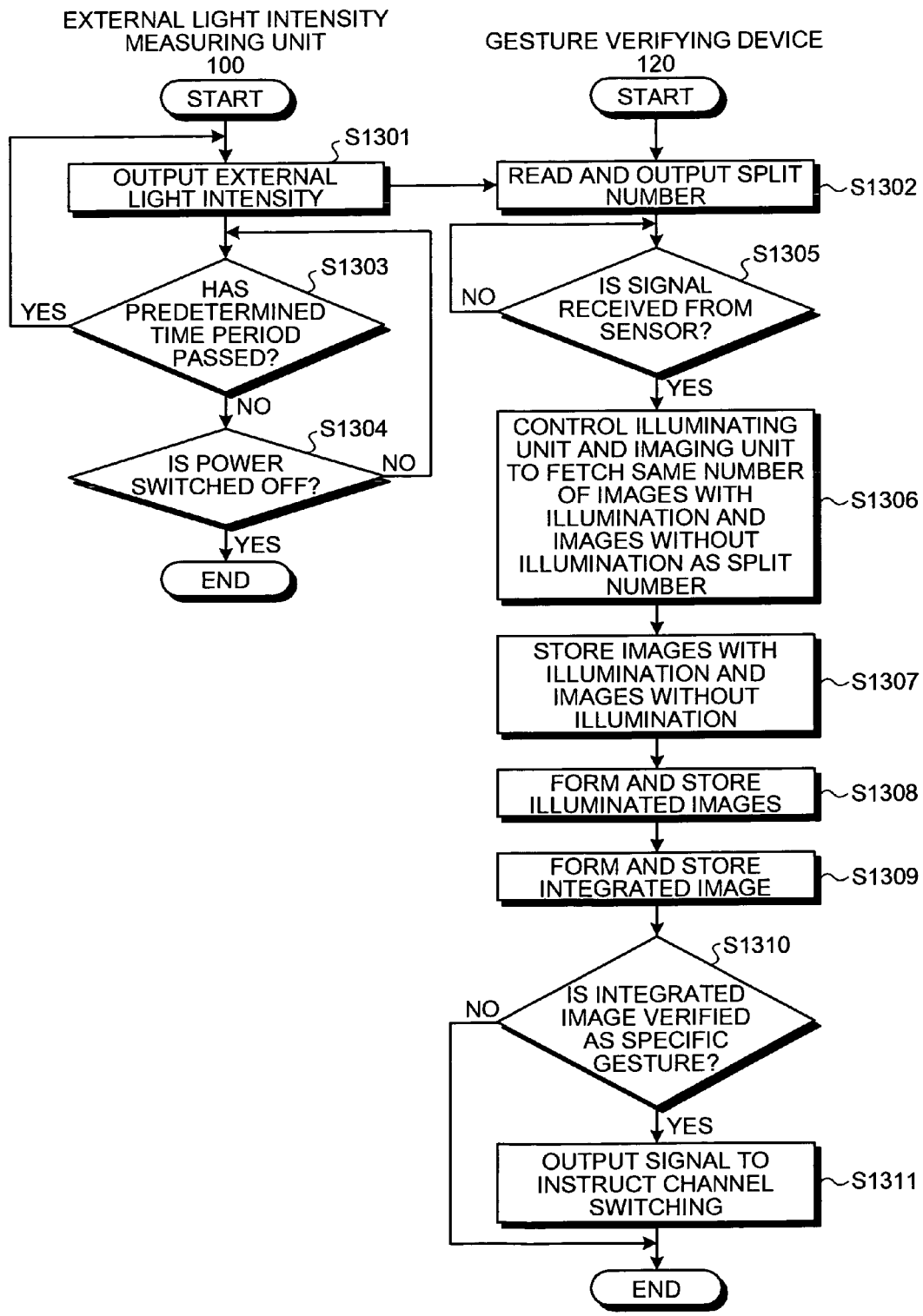
FIG. 13 is a flowchart of a gesture verifying process performed by the gesture verifying device shown in FIG. 10.

FIG. 13 is a flowchart of a gesture verifying process performed by the gesture verifying device 120.

As shown in FIG. 13, upon the external light intensity measuring unit 100 receiving the external light and outputting the external light intensity to the split number determining unit 56 of the gesture verifying device 120 (step S1301), based on the received external light intensity, the split number determining unit 56 refers to the table stored in the table storage unit 67, reads the split number, and outputs the read split number to the imaging controller 51 (step S1302). After initially outputting the external light intensity, the external light intensity measuring unit 100 waits for a predetermined time period (step S1303) and when the predetermined time period has passed (Yes at step S1303) outputs the external light intensity once again (step S1301). If the predetermined time period has not passed (No at step S1303), unless the power is switched off (No at step S1304), the external light intensity measuring unit 100 waits for the predetermined period (step S1303).

Upon receiving from the sensor 10 the signal to start taking an image (Yes at step S1305), the imaging controller 51 controls the illuminating unit 20 and the imaging unit 30, and causes the imaging unit 30 to equally split the predetermined exposure time by the split number received from the split number determining unit 56 into the split exposure times, and use the split exposure time to acquire the same number of the images with illumination and the images without illumination as the split number (step S1306).

The imaging unit 30 stores the images with illumination in the image with illumination storage unit 61 and the images without illumination in the image without illumination storage unit 62 (step S1307). The illuminated image forming unit 52 reads the images with illumination from the image with illumination storage unit 61 and the images without illumination from the image without illumination storage unit 62, forms the illuminated images, and stores the illuminated images in the illuminated image storage unit 63 (step S1308). The illuminated image integrating unit 53 reads the illuminated images from the illuminated image storage unit 63, forms the integrated image, and stores the integrated image in the integrated image storage unit 64 (step S1309).

Upon verifying that the integrated image read from the integrated image storage unit 64 is the specific gesture (Yes at step S1310), the gesture verifying unit 57 outputs to the television 110 the signal to switch to the channel corresponding to the gesture (step S1311), and ends the process. If the integrated image is not verified as the specific gesture (No at step S1310), the gesture verifying unit 57 ends the process.

According to the third embodiment, the external light intensity is measured by receiving the external light and the split number of the exposure time is determined based on the measured external light intensity. Thus, compared to the method that calculates the external light intensity by acquiring the images without illumination, the necessity of a calculating process to calculate the external light intensity can be obviated and the process speed can be increased.

Further, according to the third embodiment, the split number of the exposure time corresponding to the external light intensity is stored, the exposure time is equally split into the split exposure times by the split number corresponding to the measured external light intensity, and the image forming apparatus controls the illuminating unit and the imaging unit to use the split exposure times and acquire the same number of the images with illumination and the images without illumination as the split number. Thus, compared to the method that determines the split number using the conditional equation, the necessity of the calculating process to calculate the external light intensity can be obviated and the process speed can be increased.

Using the formed integrated image for verification is explained in the third embodiment. Using the formed integrated image for determining material is explained in a fourth embodiment of the present invention.

Figure 14:
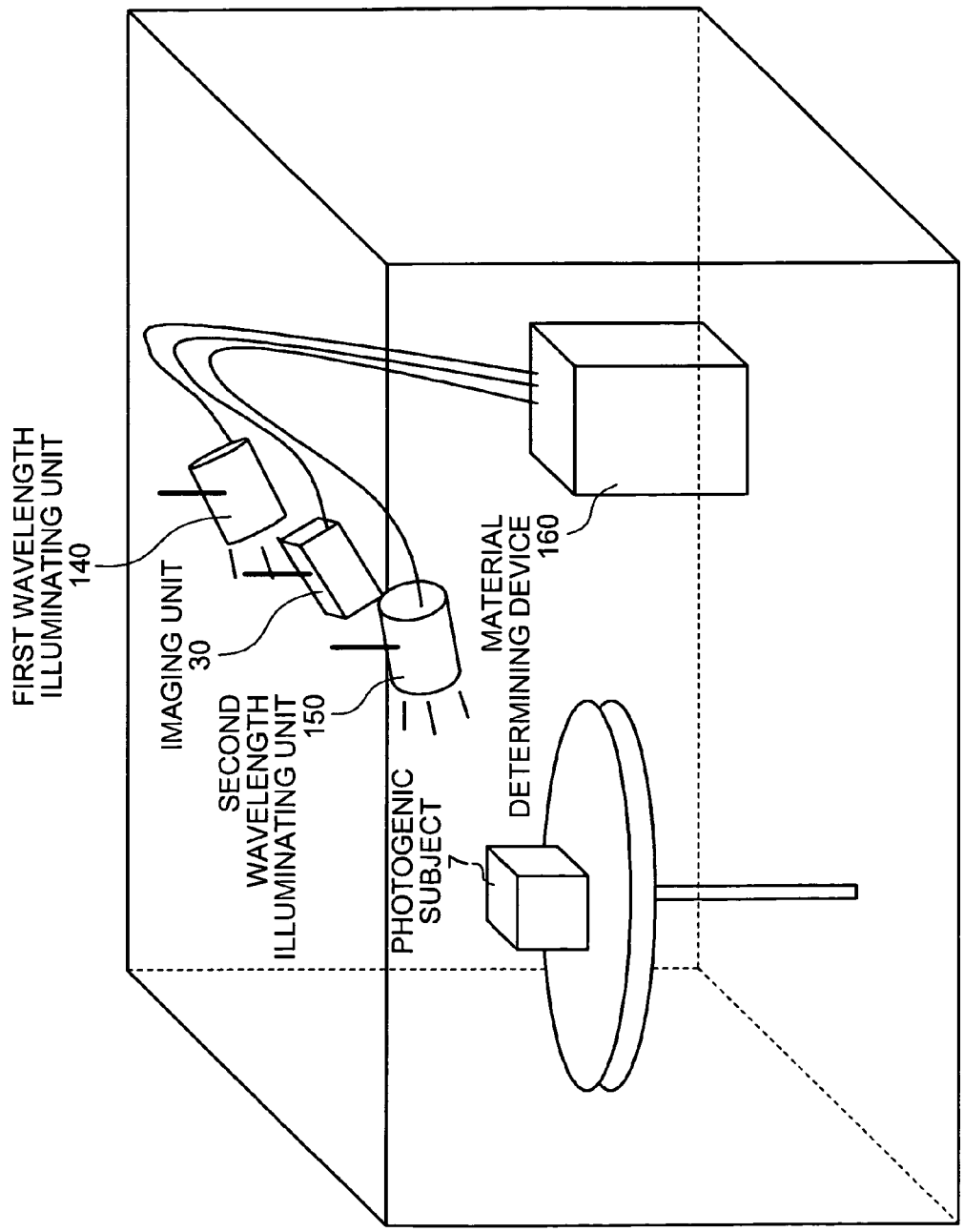
FIG. 14 is a schematic for explaining arrangement of a material determining device according to a fourth embodiment of the present invention.

An outline of a material determining device according to the fourth embodiment is explained with reference to FIG. 14. FIG. 14 is a schematic of an outline of the material determining device.

As shown in FIG. 14, a material determining device 160 according to the fourth embodiment is included at a predetermined location in a room and is connected to a first wavelength illuminating unit 140, a second wavelength illuminating unit 150, and the imaging unit 30. The first wavelength illuminating unit 140, the second wavelength illuminating unit 150, and the imaging unit 30 are fixed at locations that enable the first wavelength illuminating unit 140 and the second wavelength illuminating unit 150 to illuminate the photogenic subject 7 and enable the imaging unit 30 to take an image of the photogenic subject 7 from an appropriate distance and angle.

The photogenic subject 7 is explained next. Either a material $\alpha$ or a material $\beta$ is used as a material of the photogenic subject 7. Upon comparing absorbance spectrums of the material $\alpha$ and the material $\beta$ for a wavelength $\lambda_A$ of illumination from the first wavelength illuminating unit 140 and a wavelength $\lambda_B$ of illumination from the second wavelength illuminating unit 150, the absorbance of the material $\alpha$ and the material $\beta$ for the wavelength $\lambda_A$ is nearly the same. However, a difference occurs (the absorbance of the material $\beta$ is greater than the absorbance of the material $\alpha$) between the absorbance of the material $\alpha$ and the absorbance of the material $\beta$ for the wavelength $\lambda_B$.

Figure 15:
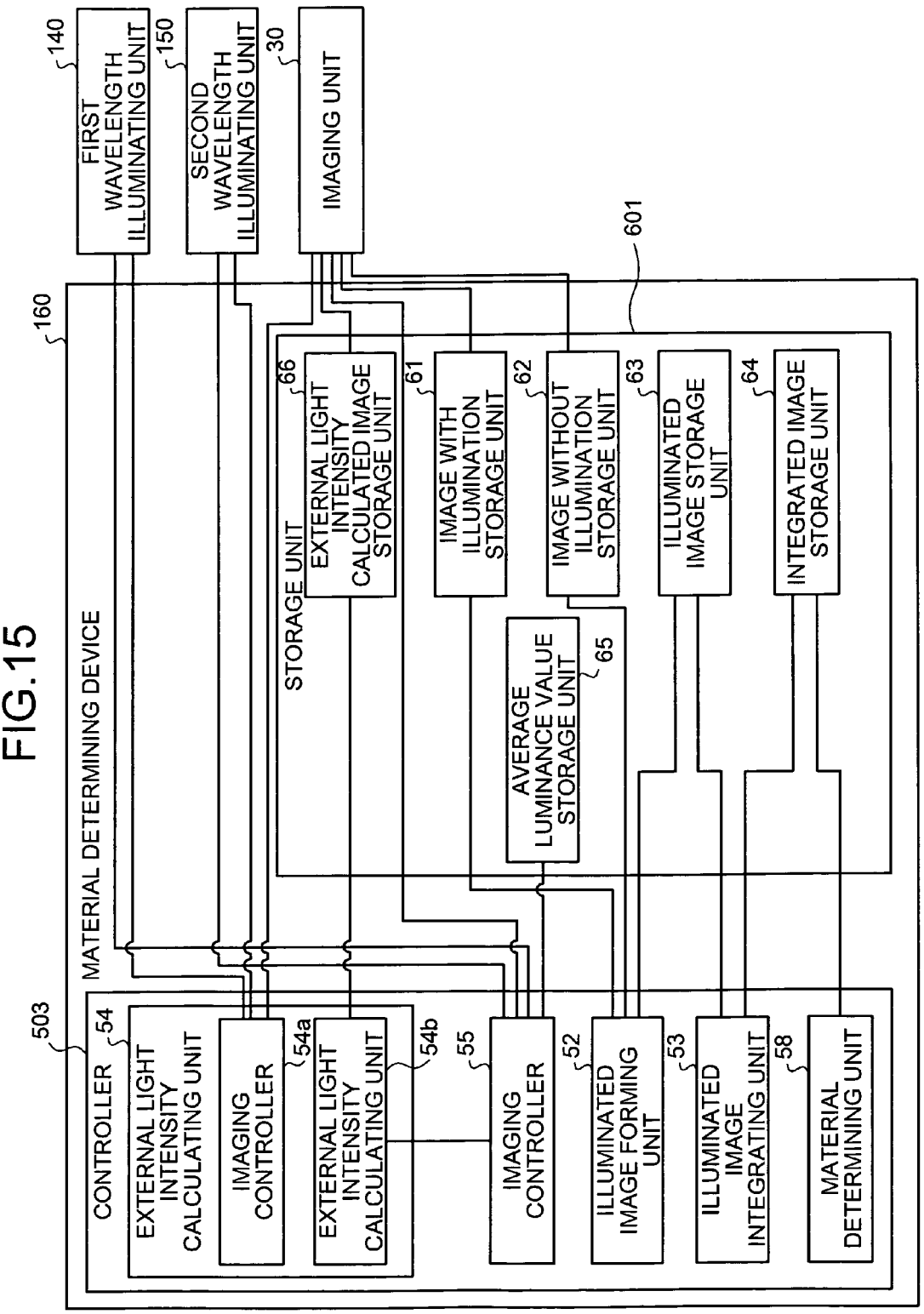
FIG. 15 is a block diagram of the material determining device shown in FIG. 14.

FIG. 15 is a block diagram of the material determining device 160. The material determining device 160 is connected to the first wavelength illuminating unit 140, the second wavelength illuminating unit 150, and the imaging unit 30 and includes a controller 503 and the storage unit 601. The first wavelength illuminating unit 140, the second wavelength illuminating unit 150, and a material determining unit 58 are explained. Functioning units that carry out the same operations as the operations of the respective functioning units in the first embodiment or the second embodiment are indicated by the same reference numerals. Among such functioning units, the external light intensity calculating unit 54, the imaging controller 55, and the average luminance value storage unit 65 are explained briefly, and explanation of the rest is omitted.

The first wavelength illuminating unit 140 emits light of a single wavelength (wavelength $\lambda_A$) as illumination. To be specific, while being controlled by the external light intensity calculating unit 54 and the imaging controller 55, the first wavelength illuminating unit 140 emits as illumination the light of the wavelength $\lambda_A$ that differs from a wavelength of the light emitted by the second wavelength illuminating unit 150 that is explained later.

Similarly as the first wavelength illuminating unit 140, the second wavelength illuminating unit 150 emits light of a single wavelength (wavelength $\lambda_B$) as illumination. To be specific, while being controlled by the external light intensity calculating unit 54 and the imaging controller 55, the second wavelength illuminating unit 150 emits as illumination the light of the wavelength $\lambda_B$ that differs from the wavelength of the light emitted by the first wavelength illuminating unit 140. If the wavelength $\lambda_A$ and the wavelength $\lambda_B$ are compared based on lengths of optimum predetermined exposure times, the wavelength $\lambda_B$ requires a longer exposure time than the wavelength $\lambda_A$.

Similarly as in the second embodiment, the average luminance value storage unit 65 stores therein the average luminance value that is needed for calculating the split number. To be specific, the average luminance value storage unit 65 stores therein the average luminance value inside the predetermined area of an image that is acquired by prior taking the image of an object (for example, an object of the material $\alpha$ or an object of the material $\beta$) in the predetermined exposure time by using only the illumination of the wavelength $\lambda_B$ of the second wavelength illuminating unit 150.

Similarly as in the second embodiment, the external light intensity calculating unit 54 controls the illuminating unit 20 and the imaging unit 30 to equally split the predetermined exposure time by the predetermined split number into the split exposure times, use the split exposure times to acquire the external light images of the photogenic subject 7 that is illuminated only by the external light, calculate the average luminance value of the predetermined area of the acquired external light images, and calculate as the external light intensity a value obtained by multiplying the average luminance value with the predetermined split number.

To be specific, the external light intensity calculating unit 54 controls the first wavelength illuminating unit 140, the second wavelength illuminating unit 150, and the imaging unit 30 to equally split into the split exposure times using the split number, the optimum exposure time of the wavelength $\lambda_B$ that is the longest optimum exposure time needed while taking the image, use the split exposure times to acquire the images without illumination (the external light intensity calculated images) of the photogenic subject 7, calculate the average luminance value of the predetermined area of the acquired external light intensity calculated images, and calculate the external light intensity by multiplying the average luminance value by the predetermined split number. In other words, because only one illuminating unit 20 is included in the second embodiment, the predetermined exposure time in the illumination of the illuminating unit 20 is equally split by the predetermined split number into the split exposure times. However, in the fourth embodiment, because the first wavelength illuminating unit 140 and the second wavelength illuminating unit 150 are included, the illumination of the wavelength $\lambda_B$ of the second wavelength illuminating unit 150 is treated as the predetermined exposure time.

Similarly as in the second embodiment, the imaging controller 55 determines as the minimum split number, the lowest integer equal to or more than a value that is calculated by dividing using the predetermined luminance value threshold, the sum of the external light intensity calculated by the external light intensity calculating unit 54 and the average luminance value of the predetermined area in the image acquired in the predetermined exposure time by illuminating the object using only the illumination of the wavelength $\lambda_B$ that is the longest optimum exposure time. The imaging controller 55 controls the first wavelength illuminating unit 140, the second wavelength illuminating unit 150, and the imaging unit 30 to equally split the predetermined exposure time using the minimum split number into the split exposure times and use the split exposure times to acquire the same number of the images with illumination and the images without illumination as the minimum split number for each illumination of the different multiple wavelengths.

The material determining unit 58 determines the material of the photogenic subject 7 from the integrated image. To be specific, the material determining unit 58 reads from the integrated image storage unit 64 the integrated image formed due to the illumination by the first wavelength illuminating unit 140 and the integrated image formed due to the illumination by the second wavelength illuminating unit 150, and uses the difference between the absorbance spectrums of the material α and the material β to determine the material of the photogenic subject 7.

For example, as shown in FIG. 16, based on an image 170 that is read from the integrated image storage unit 64 and includes only the luminance value due to the illumination by the first wavelength illuminating unit 140 and an image 180 that is read from the integrated image storage unit 64 and includes only the luminance value due to the illumination by the second wavelength illuminating unit 150, the material determining unit 58 calculates for each pixel, a ratio (A/B) of a luminance value A of a pixel included inside an area 171 of the image 170 and a luminance value B of a pixel included at the same location inside an area 181 of the image 180. The material determining unit 58 counts pixels in which the ratio (A/B) is greater than a predetermined threshold (Thλ) (the pixels that satisfy the conditional expression {A/B>Thλ}). If a number of the counted pixels is small, the material determining unit 58 determines that the material of the photogenic subject 7 is the material α. If the number of the counted pixels is large, the material determining unit 58 determines that the material of the photogenic subject 7 is the material β.

Figure 17:
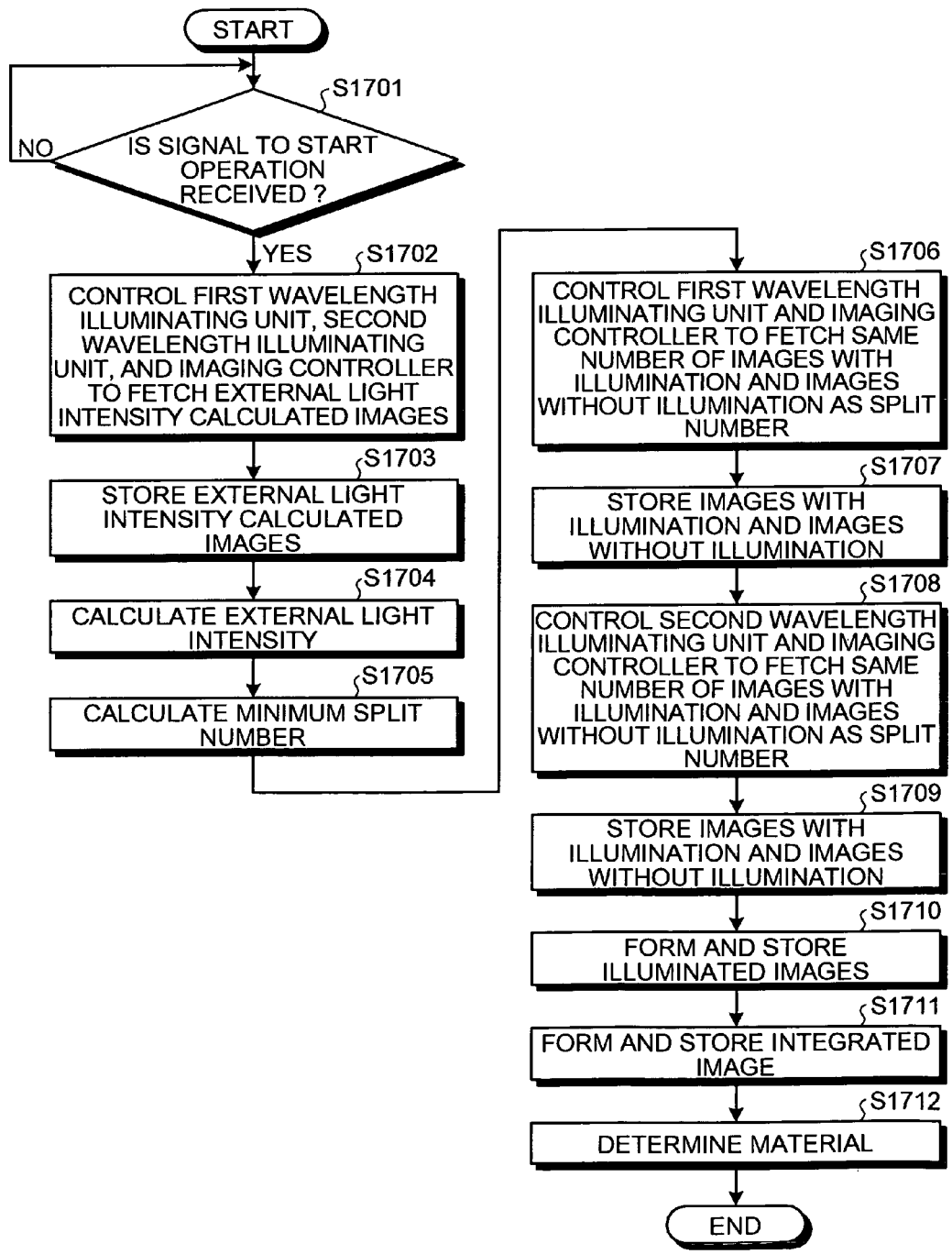
FIG. 17 is a flowchart of a material determining process performed by the material determining device shown in FIG. 15.

FIG. 17 is a flowchart of a material determining process performed by the material determining device 160.

First, upon receiving a signal to start an operation (Yes at step S1701), the material determining device 160 causes the external light intensity calculating unit 54 to control the first wavelength illuminating unit 140, the second wavelength illuminating unit 150, and the imaging unit 30, and causes the imaging unit 30 to acquire the external light intensity calculated images (step S1702).

Next, the imaging unit 30 stores the external light intensity calculated images in the external light intensity calculated image storage unit 66 (step S1703). The external light intensity calculating unit 54 reads the external light intensity calculated images from the external light intensity calculated image storage unit 66, and based on the external light intensity calculated images, calculates the external light intensity (step S1704).

Upon receiving the external light intensity from the external light intensity calculating unit 54, based on the average luminance value stored in the average luminance value storage unit 65 and the luminance value threshold, the imaging controller 55 calculates the minimum split number (step S1705). Next, the imaging controller 55 first controls the first wavelength illuminating unit 140 and the imaging unit 30 to equally split the predetermined exposure time by the minimum split number into the split exposure times, and use the split exposure times to acquire the same number of the images with illumination and the images without illumination as the minimum split number (step S1706). The imaging unit 30 stores respectively in the image with illumination storage unit 61 and the image without illumination storage unit 62, the images with illumination and the images without illumination formed due to the illumination of the first wavelength illuminating unit 140 (step S1707).

Next, the imaging controller 55 similarly controls the second wavelength illuminating unit 150 and the imaging unit 30 to split the predetermined exposure time by the minimum split number into the split exposure times, and use the split exposure times to acquire the same number of the images with illumination and the images without illumination as the minimum split number (step S1708). The imaging unit 30 stores respectively in the image with illumination storage unit 61 and the image without illumination storage unit 62, the images with illumination and the images without illumination formed due to the illumination of the second wavelength illuminating unit 150 (step S1709).

The illuminated image forming unit 52 reads the images with illumination from the image with illumination storage unit 61 and the images without illumination from the image without illumination storage unit 62, forms the illuminated images, and stores the illuminated images in the illuminated image storage unit 63 (step S1710). The illuminated image integrating unit 53 reads the illuminated images from the illuminated image storage unit 63, forms the integrated image, and stores the integrated image in the integrated image storage unit 64 (step S1711).

The material determining unit 58 reads the integrated image of each wavelength from the integrated image storage unit 64, determines the material of the photogenic subject 7 (step S1712), and ends the process.

According to the fourth embodiment, the illuminating unit emits illuminations of different multiple wavelengths. The material determining device controls the illuminating unit and the imaging unit so as to acquire an image by using an exposure time calculated by equally splitting an optimum exposure time of the wavelength of the longest optimum exposure time required for imaging by a predetermined number, use the split exposure times to acquire the external light intensity calculated images, calculate the average luminance value of the predetermined area of the acquired external light intensity calculated images, and calculate the external light intensity by multiplying the average luminance value with the predetermined split number. Next, the material determining device determines as the minimum split number, the lowest integer that is equal to or more than a value that is calculated by dividing using the predetermined luminance value threshold, the sum of the calculated external light intensity and the average luminance value of the predetermined area in the image acquired in the predetermined exposure time by illuminating the photogenic subject using the illumination of the wavelength that is the longest optimum exposure time. Further, the material determining device controls the illuminating unit and the imaging unit to equally split the predetermined exposure time by the minimum split number into the split exposure times, use the split exposure times to acquire the same number of the images with illumination and the images without illumination as the minimum split number for each illumination of the different multiple wavelengths, form the illuminated images for each of the different multiple wavelengths by subtracting the luminance values of the images without illumination from the luminance values of the images with illumination that are acquired for illuminations of each wavelength, and integrate the formed illuminated images of each wavelength to form for each wavelength the integrated image that includes only the luminance value of the illumination. Thus, regardless of the length of the wavelengths of the illumination, the image that includes only the accurate luminance value of the illumination can be easily formed for each wavelength even if the external light is strong.

The embodiments of the present inventions are explained above. However, various modifications may be made other than the specific details and representative embodiments shown and described herein. Various other embodiments of the present invention are explained separately as (1) to (5) as shown below.

(1) Splitting of the Predetermined Exposure Time

Equally splitting the predetermined exposure time using the split number is explained in the embodiments. However, the present invention is not to be thus limited, and the predetermined exposure time need not always be split equally. The predetermined exposure time can simply be split into the same number of split exposure times as the split number.

(2) Integration Number of the Illuminated Images

Obtaining the same number of the images with illumination and the images without illumination as the split number, forming the illuminated images after storing the images with illumination and the images without illumination, and forming the integrated image after storing the same number of the illuminated images as the split number is explained in the embodiments. However, the present invention is not to be thus limited, and after acquiring and storing a pair of the image with illumination and the image without illumination, the pair can be immediately read from the storage unit to form the illuminated image. After storing the illuminated image, the illuminated image can be immediately read from the storage unit to start formation of the integrated image. A predetermined threshold can be included for the luminance value of the integrated image, and the string of the process from acquiring the next pair of the image with illumination and the image without illumination till formation of the integrated image can be continued until the luminance value of the integrated image exceeds the predetermined threshold.

To be specific, the imaging controller 51 controls the illuminating unit 20 and the imaging unit 30 to acquire a pair of the image with illumination and the image without illumination.

Upon one image with illumination getting stored in the image with illumination storage unit 61 and one image without illumination getting stored in the image without illumination storage unit 62, the illuminated image forming unit 52 immediately reads the image with illumination and the image without illumination, forms the illuminated image, and stores the illuminated image in the illuminated image storage unit 63.

Upon one illuminated image getting stored in the illuminated image storage unit 63, the illuminated image integrating unit 53 immediately reads to integrate the illuminated image, and stores the read illuminated image as the integrated image in the integrated image storage unit 64. After initially reading the illuminated image from the illuminated image storage unit 63, because an illuminated image for integrating does not exist, the illuminated image integrating unit 53 simply stores the read illuminated image in the integrated image storage unit 64. From second time onwards, apart from reading the illuminated image, the illuminated image integrating unit 53 also reads the incomplete integrated image from the integrated image storage unit 64 to integrate the two images, and stores the resulting integrated image in the integrated image storage unit 64. The illuminated image integrating unit 53 continues to output to the imaging controller 51 the signal to instruct acquiring of another pair of the image with illumination and the image without illumination until the luminance value of the integrated image exceeds the predetermined threshold.

Due to this, a used area of the storage unit can be reduced. Further, the integration can be terminated when the luminance value of the integrated image has reached the set luminance value, and the process speed can be increased.

(3) Number of the Acquired Images with Illumination and the Images without Illumination Obtaining the same number of the images with illumination and the images without illumination as the split number is explained in the embodiments. However, the present invention is not to be thus limited, and any one of the images with illumination and the images without illumination or both can be acquired using the whole or a part of each split exposure time. For example, a number N of the images with illumination can be the same as the split number and a number M of the images without illumination can be less than N.

Because the luminance value of the images without illumination is less than the luminance value of the images with illumination, the influence exerted on the integrated image by the noise included in the images without illumination is less than the influence exerted by the noise included in the images with illumination. For example, upon assuming as an extreme example that the external light is significantly weak, the images without illumination are nearly dark, and the luminance value is nearly zero, a magnitude of the noise included in the images without illumination is negligible, and the influence on the final integrated image is also negligible. Due to this, even if acquiring of the images without illumination is omitted, the influence on the integrated image is not significant, and the actual influence is nearly absent.

Formation of the integrated image by using the N number of the images with illumination and the M number of the images without illumination is explained below. First, equal splitting of the predetermined exposure time by the split number is explained. Forming the illuminated images by subtracting the luminance value of the images without illumination from the luminance value of the images with illumination is explained in the embodiments. However, when using the N number of the images with illumination and the M number of the images without illumination, the luminance value of the images without illumination is multiplied by "N/M" to calculate a difference and form the illuminated images. Multiplying the luminance value of the images without illumination by N/M corrects the less number of the images without illumination and the smaller luminance value of the images without illumination.

Even when the predetermined exposure time is not equally split into the split exposure times, a similar correction according to the exposure time is carried out. For example, if T is the predetermined exposure time and t is a value obtained by integrating the split exposure times of the finally acquired images without illumination, the luminance value of the images without illumination is multiplied by "T/t" to calculate the difference and form the illuminated images.

Thus, by reducing the number of the images without illumination, the imaging time and the calculation time can be reduced and the process speed can be enhanced.

(4) External Light Intensity Calculated Images

Using the external light intensity calculated images only for calculating the external light intensity is explained in the embodiments. However, the present invention is not to be thus limited, and the acquired external light intensity calculated images can also be used as the images without illumination that are used for forming the illuminated images.

To be specific, when the minimum split number calculated by the imaging controller 55 is the same as the predetermined split number, the illuminating unit 20 and the imaging unit 30 can be controlled to acquire the same number of the images with illumination and the images without illumination as the split number while using the external light intensity calculated images acquired by the external light intensity calculating unit 54 as the images without illumination. Due to this, the imaging time can be reduced in direct proportion to the usage of the external light intensity calculated images. When using the external light intensity calculated images as the images without illumination, the external light intensity calculating unit 54 can also use the split number determined during the previous imaging as the predetermined split number that is used for acquiring the external light intensity calculated images. Because the external light intensity changes gradually in many instances, using the split number determined during the previous imaging increases a possibility of using the external light intensity calculated images as the images without illumination, and the process speed can be increased.

(5) Target of Application

The facial image, the image of the hand, and the image of an object are explained in the embodiments as examples of the formed image that only includes the accurate luminance value of the illumination. However, the present invention is not to be thus limited, and can be similarly applied to any device that acquires an image.

(6) Structure of a System Etc.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used. For example, the imaging controller 51 and the split number determining unit 56 can be integrated. The process functions performed by the apparatus are entirely or partially realized by the CPU or a program executed by the CPU or by a hardware using wired logic.

All the automatic processes explained in the present embodiment can be, entirely or in part, carried out manually. Similarly, all the manual processes explained in the present embodiment can be entirely or in part carried out automatically by a known method. For example, in the first embodiment, the sensor 10 detects the photogenic subject 7 entering the room and the imaging unit 30 automatically starts taking an image. However, an operator can also monitor the photogenic subject 7 and manually start taking the image. The sequence of processes, the sequence of controls, specific names, and data including various parameters can be changed as required unless otherwise specified. For example, when acquiring the images with illumination and the images without illumination in the material determining process, the process of taking the images by controlling the first wavelength illuminating unit 140 and the process of taking the images by controlling the second wavelength illuminating unit 150 can be carried out in any sequence.

(7) Image Forming Program

Figure 18:
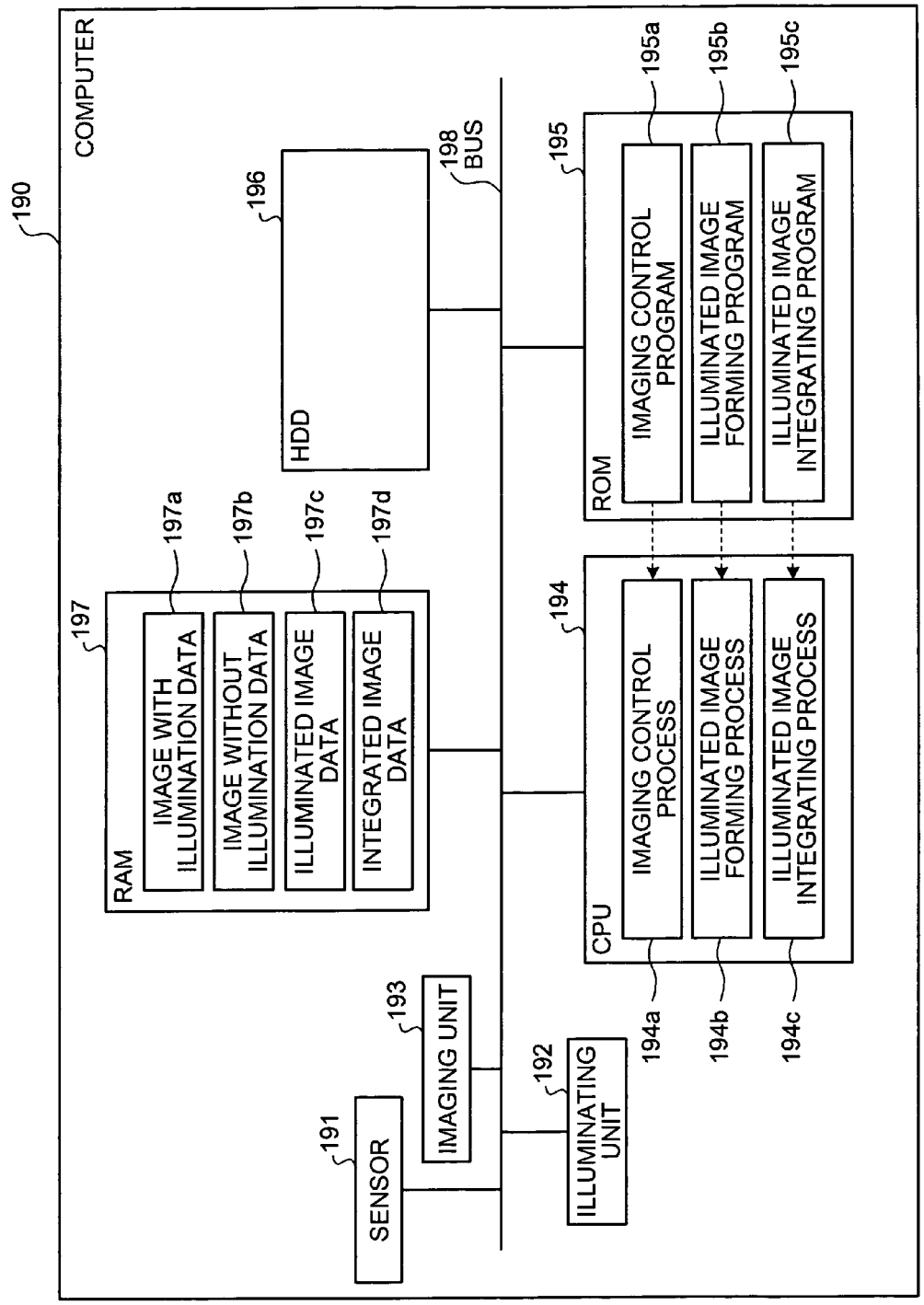
FIG. 18 is a block diagram of a computer that executes an image forming program.
Figure 19:
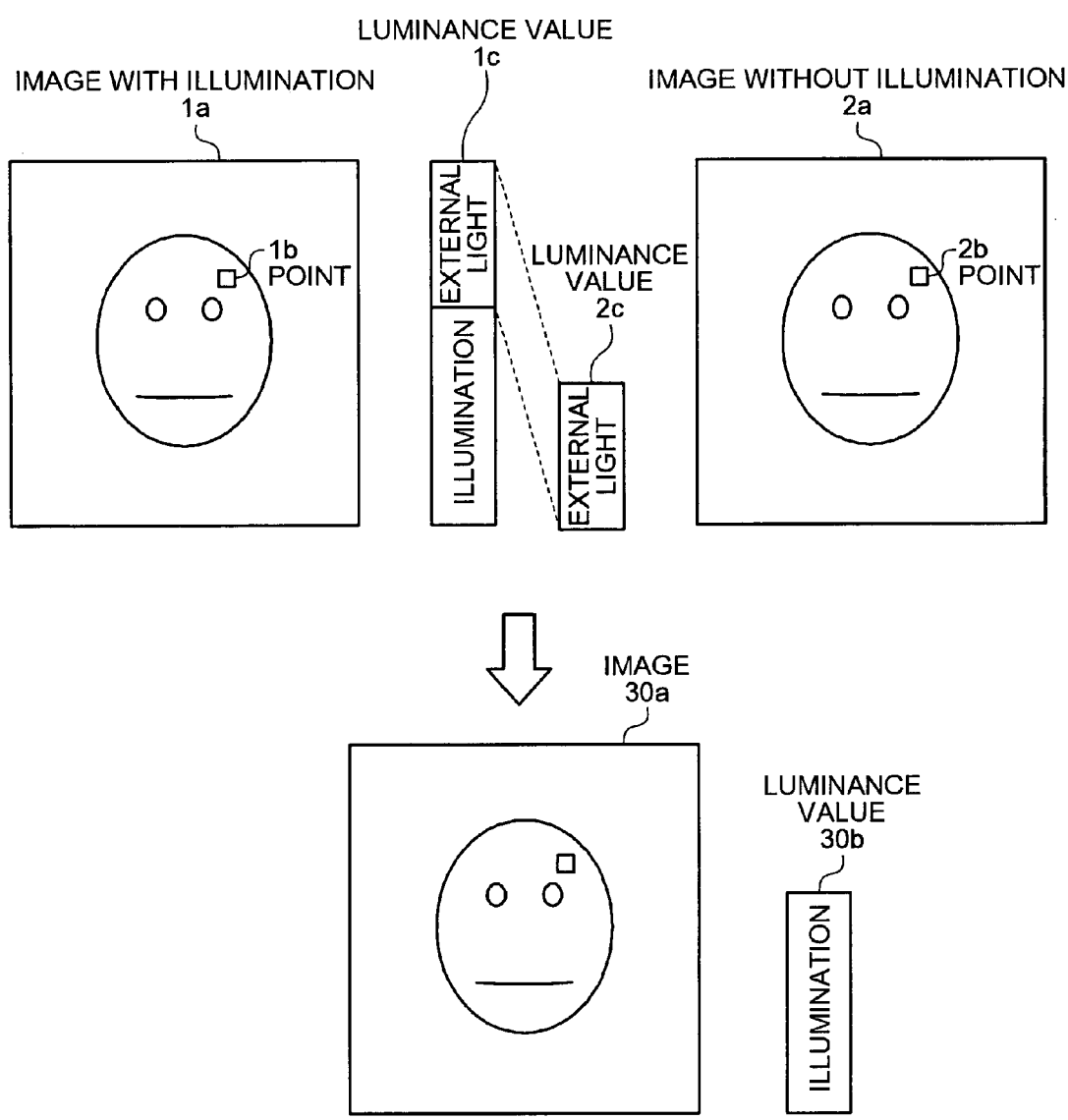

Realizing various processes by hardware logic is explained in the first embodiment. However, the present invention is not to be thus limited, and the processes can also be realized by executing a prior formulated program using a computer. An example of the computer which executes an image forming program that includes similar functions as the functions of the image forming apparatus 40 explained in the first embodiment is explained with reference to FIG. 18. FIG. 18 is a block diagram of the computer that executes the image forming program.

As shown in FIG. 18, a computer 190 includes a sensor 191, an illuminating unit 192, an imaging unit 193, a Central Processing Unit (CPU) 194, a Read Only Memory (ROM) 195, a Hard Disk Drive (HDD) 196, and a Random Access Memory (RAM) 197 that are connected by buses 198.

The ROM 195 stores therein the image forming program that exhibits similar functions as the functions of the image forming apparatus 40 explained in the first embodiment. In other words, as shown in FIG. 18, the ROM 195 prior stores therein an imaging control program 195a, an illuminated image forming program 195b, and an illuminated image integrating program 195c. Similarly as the components of the image forming apparatus 40 shown in FIG. 3, the programs 195a to 195c can also be appropriately integrated or broken down.

The CPU 194 reads the programs 195a to 195c from the ROM 195 and executes the read programs 195a to 195c, thereby causing the programs 195a to 195c to function as an imaging process 194a, an illuminated image forming process 194b, and an illuminated image integrating process 194c as shown in FIG. 18. The processes 194*a* to 194*c* correspond respectively to the imaging controller 51, the illuminated image forming unit 52, and the illuminated image integrating unit 53 that are shown in FIG. 3.

Based on image with illumination data 197*a*, image without illumination data 197*b*, illuminated image data 197*c*, and integrated image data 197*d* that are stored in the RAM 197, the CPU 194 executes the image forming process.

The programs 195*a* to 195*c* need not always be stored in the ROM 195 from the beginning. For example, each of the programs 195*a* to 195*c* can be stored in a "portable physical medium" such as a Flexible Disk (FD), a Compact Disk-Read Only Memory (CD-ROM), a Magneto Optical (MO) disk, a Digital Versatile Disk (DVD), an Integrated Circuit (IC) card etc. that can be inserted in the computer 190, a "fixed physical medium" such as an HDD that can be included inside or outside the computer 190, "another computer (or server)" that is connected to the computer 190 via a public line, the Internet, a Local Area Network (LAN), a Wide Area Network (WAN) etc. Each of the programs 195*a* to 195*c* can be read by the computer 190 from such media and executed.

According to an aspect of the present invention, an image that only includes an accurate luminance value of illumination can be easily formed.

According to another aspect of the present invention, a split number of a predetermined exposure time is determined based on external light intensity. Due to this, for example, when the external light is significantly strong, the split number of the exposure time can be increased compared to when the external light is marginally strong. Thus, by flexibly adjusting to change of the external light, the image that only includes the accurate luminance value of the illumination can be easily formed.

According to still another aspect of the present invention, compared to a method that directly measures the external light intensity from the external light, a necessity to newly include a device that measures intensity of the external light can be obviated, and formation of the image that only includes the accurate luminance value of the illumination can be easily realized. Further, compared to a method that splits the predetermined exposure time into different multiple exposure times, using a simple process to equally split the predetermined exposure time enables to increase the process speed. Moreover, because the image is acquired using the minimum split number, a probability of noise entering during imaging can be reduced and the process speed can be increased.

According to still another aspect of the present invention, by using external light images as images without illumination, imaging time can be reduced proportionately.

According to still another aspect of the present invention, compared to a method that calculates the external light intensity by acquiring the images without illumination, the necessity of a calculation process to calculate the external light intensity can be obviated and the process speed can be increased.

According to still another aspect of the present invention, compared to a method that determines the split number using a conditional expression, the necessity of a calculation process to calculate the split number can be obviated and the process speed can be increased.

According to still another aspect of the present invention, the formed multiple illuminated images are integrated to form an integrated image of a predetermined luminance value. Due to this, formation of the image and the integration can be terminated when the luminance value of the integrated image reaches a set luminance value and the process speed can be increased.

According to still another aspect of the present invention, regardless of wavelengths of the illumination, the image that includes only the accurate luminance value of the illumination can be easily formed for each wavelength even if the external light is strong.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that causes an imaging unit to acquire a first image of a photogenic subject by illuminating the photogenic subject with external light and with light of an illuminating unit and acquires a second image by illuminating the photogenic subject with only the external light, and subtracts luminance values of the second image from those of the first image thereby obtaining a luminance difference image that include only luminance values corresponding to the light of the illuminating unit, the image forming apparatus comprising:

an imaging controller that controls the illuminating unit and the imaging unit to split a predetermined exposure time into a plurality of split exposure times and to acquire, for each split exposure time or by selecting a part of the desired split exposure time, the first image and the second image;

a calculating unit that subtracts the luminance values of the second images from those of the first images that are acquired by the imaging controller thereby obtaining a luminance difference image for each split exposure time; and an integrating unit that integrates the luminance difference images thereby forming an integrated image in which only the luminance values of the illumination are integrated.

2. The image forming apparatus according to claim 1, wherein the imaging controller determines, based on external light intensity that is an intensity of the external light, the split number of the predetermined exposure time.

3. The image forming apparatus according to claim 2, further comprising an external light intensity calculating unit that controls the illuminating unit and the imaging unit to equally split the predetermined exposure time into exposure times by the predetermined split number and use the exposure times to acquire a third image of a sample photogenic subject that is illuminated only by the external light, calculates an average luminance value of a predetermined area in the third image, and calculates the external light intensity by multiplying the average luminance value by the predetermined split number, wherein the imaging controller determines as a minimum split number, the lowest integer that is greater than or equal to a value obtained by dividing using a predetermined luminance value threshold, a sum of the external light intensity and an average luminance value of a predetermined area in a fourth image that is obtained by illuminating the sample photogenic subject only with the illumination of the illuminating unit in the predetermined exposure time, and controls the illuminating unit and the imaging unit to acquire, in the exposure time that is equally split into the minimum split number, the same number of the first images and the second images as the split number.

4. The image forming apparatus according to claim 3, wherein the imaging controller uses as the second image, if the minimum split number being equal to the predetermined split number, the third image, and controls the illuminating unit and the imaging unit to acquire the same number of the first images and the second images as the split number.

5. The image forming apparatus according to claim 2, further comprising an external light intensity measuring unit that measures the external light intensity, wherein
the imaging controller determines the split number of the predetermined exposure time based on the external light intensity.

6. The image forming apparatus according to claim 5, further comprising a split number storage unit that stores therein, by establishing a correspondence with the external light intensity, the split number of the exposure time, wherein
the imaging controller reads from the split number storage unit the split number of the exposure time corresponding to the external light intensity, and controls the illuminating unit and the imaging unit to acquire, in the exposure time that is equally split into the split number, the same number of the first images and the second images as the split number.

7. The image forming apparatus according to claim 1, wherein the integrating unit continuously integrates the multiple illuminated images thereby forming the integrated image of a predetermined luminance value.

8. The image forming apparatus according to claim 3, wherein
the illuminating unit emits illuminations of a plurality of different wavelengths,
the external light intensity calculating unit controls the illuminating unit and the imaging unit so as to acquire the third image by using an exposure time calculated by equally splitting an optimum exposure time of the wavelength of the longest optimum exposure time required for imaging by a predetermined number, use the split exposure times to acquire the third images, calculates an average luminance value of a predetermined area in the third images, and calculates external light intensity by multiplying the average luminance value with the predetermined split number,
the imaging controller determines as a minimum split number, the lowest integer that is greater than or equal to a value, calculated by dividing by a predetermined luminance value threshold, a sum of the external light intensity calculated by the external light intensity calculating unit and the average luminance value of the predetermined area in an image, acquired using the predetermined exposure time by illuminating the photogenic subject by an illumination of the wavelength whereof the optimum exposure time is the longest, and controls the illuminating unit and the imaging unit to acquire, for each illumination of the different wavelengths, in the exposure time that is equally split by the minimum split number, the same number of the first images and the second images as the minimum split number,
the illuminating image generating unit subtracts the luminance values of the second images from those of the first images that are formed due to illuminations of each wavelength and that are acquired due to control by the imaging controller, and forms the luminance difference image for each of the different wavelengths, and
the integrating unit integrates, the luminance difference image of each wavelength, and forms for each wavelength, the integrated image in which only the luminance values of the illumination are integrated.

9. A method of acquiring, using an imaging unit, a first image of a photogenic subject by illuminating the photogenic subject with external light and with light of an illuminating unit and acquires a second image by illuminating the photogenic subject with only the external light, and subtracts luminance values of the second image from those of the first image thereby obtaining a luminance difference image that include only luminance values corresponding to the light of the illuminating unit, the method comprising:
controlling the illuminating unit and the imaging unit to split a predetermined exposure time into a plurality of split exposure times and to acquire, for each split exposure time or by selecting a part of the desired split exposure time, the first image and the second image;
subtracting the luminance values of the second image from those of the first image thereby forming a luminance difference image for each split exposure time; and
integrating the luminance difference images for all the split exposure times thereby forming an integrated image in which only the luminance values of the illumination are integrated.

10. The method according to claim 9, further comprising determining a split number of the predetermined exposure time based on external light intensity that is an intensity of the external light.

11. The method according to claim 10, further comprising calculating an average luminance value of a predetermined area in a third image, and calculates the external light intensity by multiplying the average luminance value by the predetermined split number, wherein the third image being obtained by controlling the illuminating unit and the imaging unit to equally split the predetermined exposure time into exposure times by the predetermined split number and using the exposure times to acquire the third image of a sample photogenic subject that is illuminated only by the external light, wherein
the determining includes determining as a minimum split number, the lowest integer that is greater than or equal to a value obtained by dividing using a predetermined luminance value threshold, a sum of the external light intensity and an average luminance value of a predetermined area in a fourth image that is obtained by illuminating the sample photogenic subject only with the illumination of the illuminating unit in the predetermined exposure time, and controlling the illuminating unit and the imaging unit to acquire, in the exposure time that is equally split into the minimum split number, the same number of the first images and the second images as the split number.

12. The method according to claim 11, wherein the determining includes using as the second image, if the minimum split number being equal to the predetermined split number, the third image, and controlling the illuminating unit and the imaging unit to acquire the same number of the first images and the second images as the split number.

13. The method according to claim 10, further comprising measuring the external light intensity, wherein
the determining includes determining the split number of the predetermined exposure time based on the external light intensity measured at the measuring.

14. The method according to claim 13, further comprising storing in a storage unit, by establishing a correspondence with the external light intensity, the split number of the exposure time, wherein
the determining includes reading from the storage unit the split number of the exposure time corresponding to the external light intensity, and controlling the illuminating unit and the imaging unit to acquire, in the exposure time that is equally split into the split number, the same number of the first images and the second images as the split number.

15. The method according to claim 9, wherein the integrating includes continuously integrating the multiple illuminated images thereby forming the integrated image of a predetermined luminance value.

16. The method according to claim 11, wherein
the illuminating unit emits illuminations of a plurality of different wavelengths,
the calculating includes controlling the illuminating unit and the imaging unit so as to acquire the third image by using an exposure time calculated by equally splitting an optimum exposure time of the wavelength of the longest optimum exposure time required for imaging by a predetermined number, using the split exposure times to acquire the third images, calculating an average luminance value of a predetermined area in the third images, and calculating external light intensity by multiplying the average luminance value with the predetermined split number,
the determining includes determining as a minimum split number, the lowest integer that is greater than or equal to a value, calculated by dividing by a predetermined luminance value threshold, a sum of the external light intensity calculated by the external light intensity calculating unit and the average luminance value of the predetermined area in an image, acquired using the predetermined exposure time by illuminating the photogenic subject by an illumination of the wavelength whereof the optimum exposure time is the longest, and controlling the illuminating unit and the imaging unit to acquire, for each illumination of the different wavelengths, in the exposure time that is equally split by the minimum split number, the same number of the first images and the second images as the minimum split number,
the subtract includes subtracting the luminance values of the second images from those of the first images that are formed due to illuminations of each wavelength and that are acquired due to control at the determining, and forming the luminance difference image for each of the different wavelengths, and
the integrating includes integrating, the luminance difference image of each wavelength, thereby forming for each wavelength, the integrated image in which only the luminance values of the illumination are integrated.

17. A computer-readable recording medium that stores therein an image forming program that causes a computer to implement a method of acquiring, using an imaging unit, a first image of a photogenic subject by illuminating the photogenic subject with external light and with light of an illuminating unit and acquires a second image by illuminating the photogenic subject with only the external light, and subtracts luminance values of the second image from those of the first image thereby obtaining a luminance difference image that include only luminance values corresponding to the light of the illuminating unit, the image forming program causing the computer to execute:
controlling the illuminating unit and the imaging unit to split a predetermined exposure time into a plurality of split exposure times and to acquire, for each split exposure time or by selecting a part of the desired split exposure time, the first image and the second image;
subtracting the luminance values of the second image from those of the first image thereby forming a luminance difference image for each split exposure time; and
integrating the luminance difference images for all the split exposure times thereby forming an integrated image in which only the luminance values of the illumination are integrated.

* * * * *